United States Patent [19]

Sacarisen et al.

[11] Patent Number: 4,641,308
[45] Date of Patent: Feb. 3, 1987

[54] METHOD OF INTERNAL SELF-TEST OF MICROPROCESSOR USING MICROCODE

[75] Inventors: Stephen P. Sacarisen; Otto N. Fanini, both of Houston, Tex.

[73] Assignee: Texas Instruments Incorporated, Dallas, Tex.

[21] Appl. No.: 567,598

[22] Filed: Jan. 3, 1984

[51] Int. Cl.[4] .............................................. G06F 11/00
[52] U.S. Cl. ....................................... 371/16; 364/200
[58] Field of Search ............................. 371/27, 16, 15; 324/73 R; 364/200, 900

[56] References Cited

U.S. PATENT DOCUMENTS

| 4,127,768 | 11/1978 | Negi et al. | 371/16 |
| 4,347,608 | 8/1982 | Appiano et al. | 371/16 |
| 4,402,044 | 8/1983 | McDonough et al. | 364/200 |
| 4,517,661 | 5/1985 | Graf et al. | 364/900 |

Primary Examiner—Charles E. Atkinson
Attorney, Agent, or Firm—John G. Graham

[57] ABSTRACT

A microprocessor device is used in an adapter for a communications loop of the closed ring, one-way, token-passing local area network type. Each station has a host processor with a host CPU, a main memory, and a system bus, and has an adapter including the microprocessor tested according to the invention. The adapter coupled to the main memory by the system bus and includes a local CPU (the microprocessor), a local read/write memory, and a local bus. A transmit-and-receive controller is coupled to the local bus to directly access the local read/write memory; when this station receives a free token, the transmit-and-receive controller copies the message frame to be transmitted from the local read/write memory to the outgoing signal path, converting from parallel to serial. When a message addressed to this station is received, the controller converts it from serial to parallel, and copies the message frame into the local read/write memory via the local bus. Testing of the microprocessor is accomplished by internal self-test of the registers of the device, using the microcode of the control ROM initiated by a test control input.

8 Claims, 24 Drawing Figures

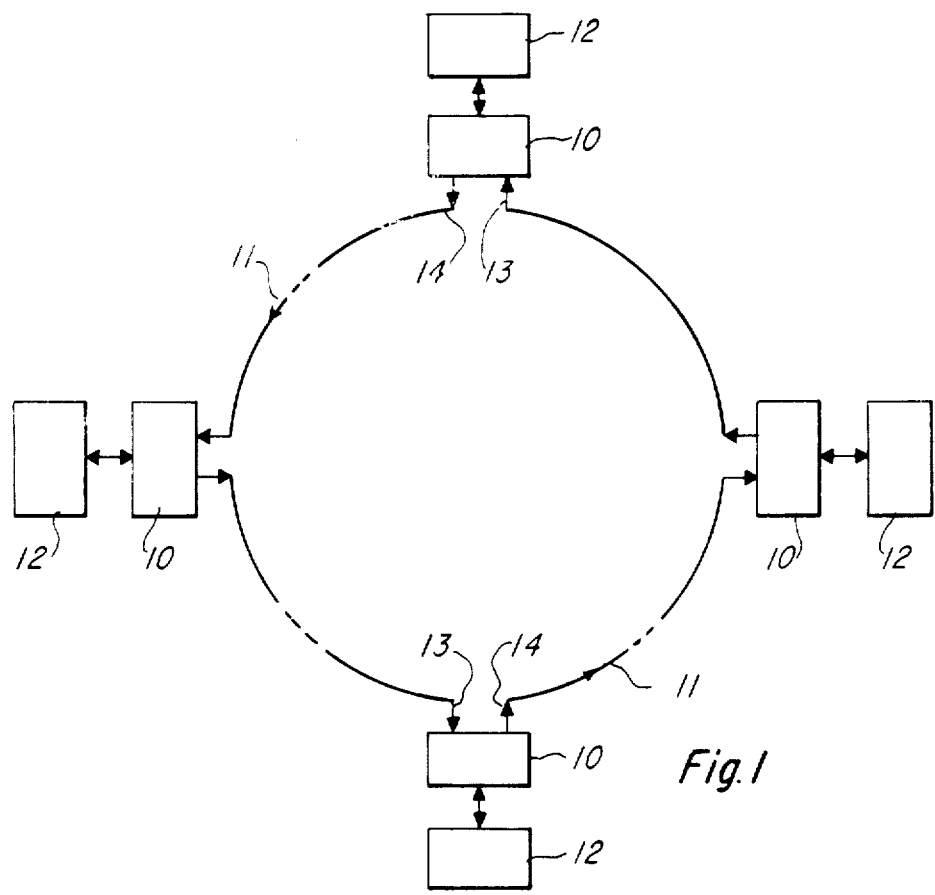
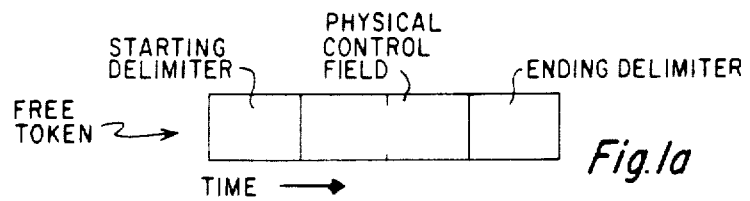
Fig.1a
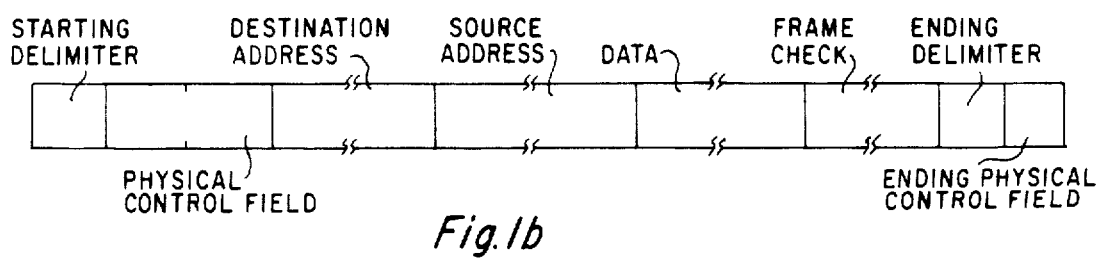
Fig.1b

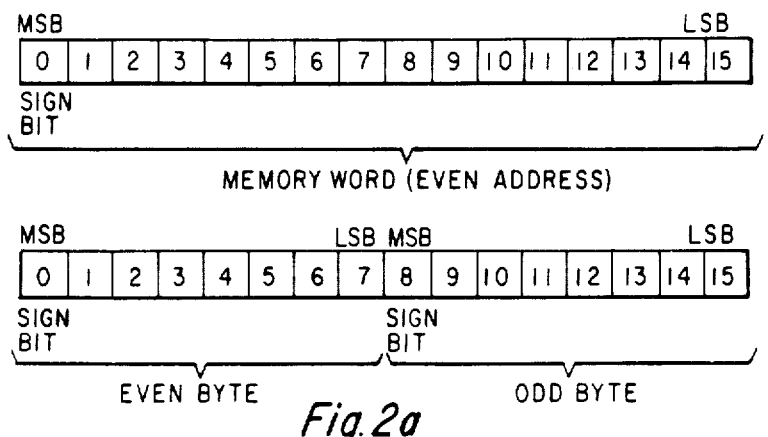
Fig. 2a
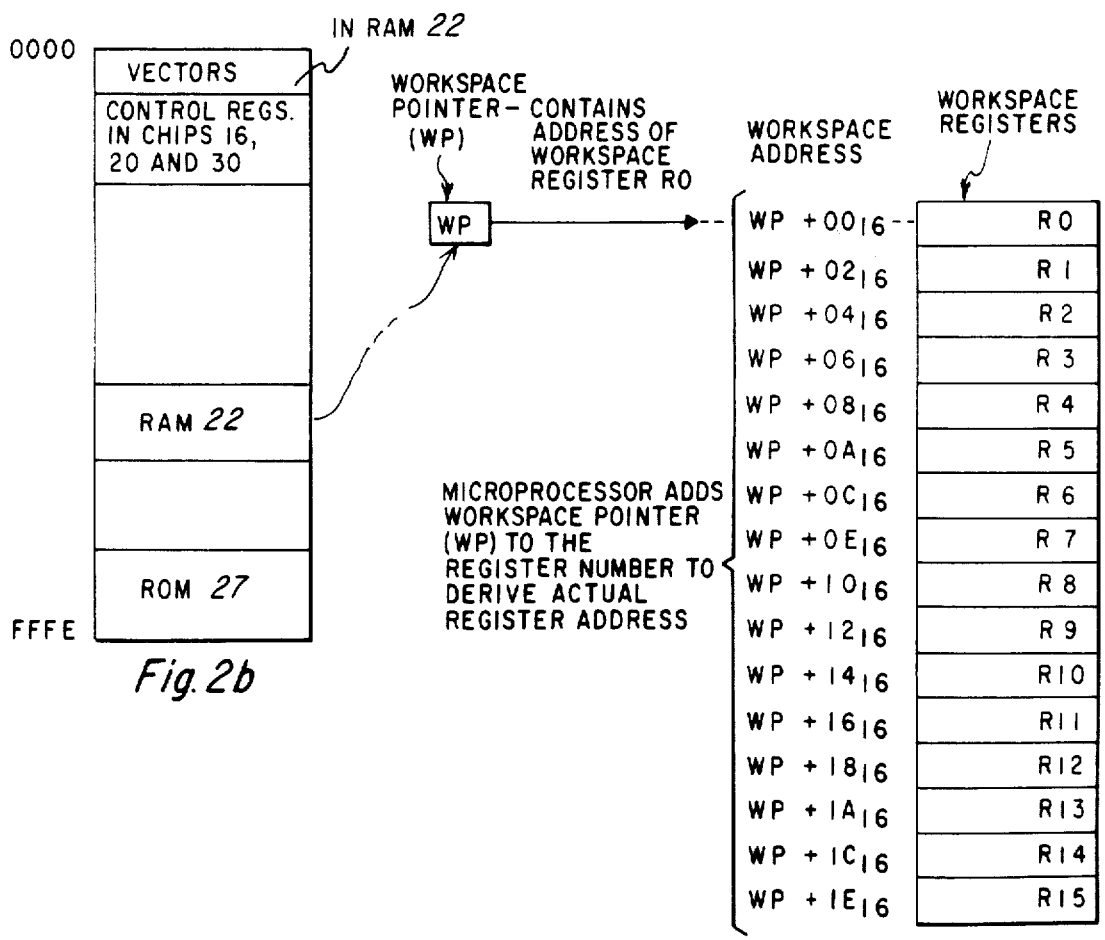
Fig. 2b
Fig. 2c

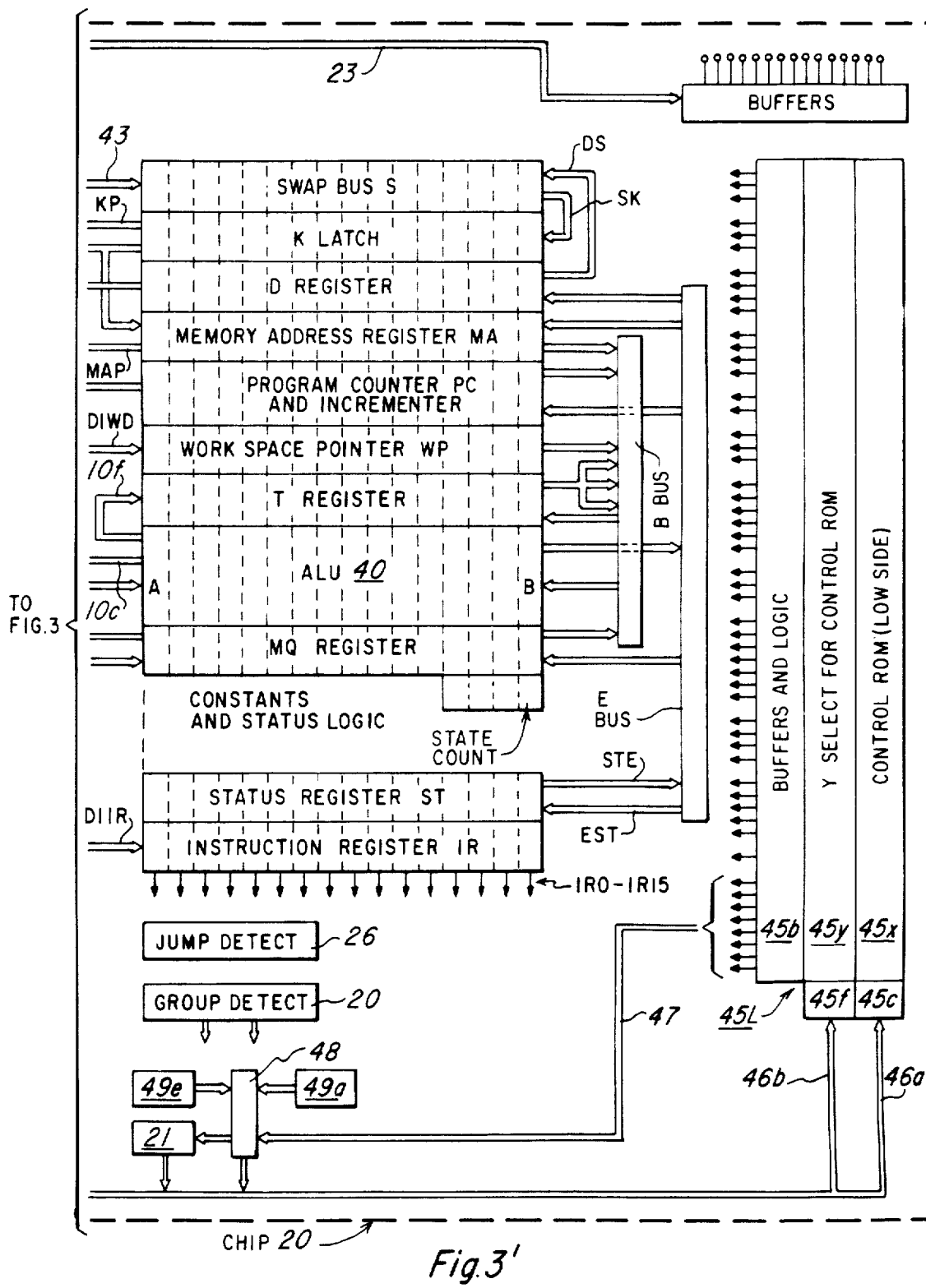

| STATE TIME | OPERATION | ALU INPUTS/OUTPUT | ADDRESS/DATA BUS 4 | OTHER |
|---|---|---|---|---|
| S1 | PRE-FETCH INSTRUCTION AT ADDRESS IN PC FOR THE ADD OPERATION; PERFORM ALU OPERATION FOR OLD INSTRUCTION | PERFORMS ALU OPERATION FOR OLD INSTRUCTION, RESULT TO E BUS DELAYED | READ CYCLE; ADDRESS FROM PC OUT VIA P BUS AND BUS 4; DATA BACK IN ON BUS 4 TO K REG VIA BUS S | INCREMENT PC DEN-ACTIVE |
| S2 | WRITE RESULT OF OLD INSTRUCTION AT OLD DESTINATION ADDRESS; CALCULATE SOURCE ADDRESS FOR NEW INSTRUCTION | ADDS 25 + WP; A INPUT IS S FIELD FOR INCOMING INSTRUCTION WORD OFF DI BUS; B INPUT IS WP VIA B BUS OUTPUT TO E, DELAYED | WRITE CYCLE, DEST ADDRESS FOR OLD INSTRUCTION ON BUS 4 FROM MA, THEN DATA OUT ON BUS 4 FROM D REG. | LOAD IR VIA DI BUS AND DETERMINE ENTRY POINT FOR ADD INSTRUCTION |
| S3 | FETCH SOURCE OPERAND AT ADDRESS IN MA; CALCULATE ADDRESS OF DESTINATION REGISTER | ADDS 20 + WP; A INPUT IS D FIELD FROM INSTRUCTION; B INPUT IS WP; RESULT TO MA VIA E DELAYED | READ CYCLE; SOURCE ADDRESS OUT FROM MA TO BUS 4; DATA BACK IN ON BUS 4 TO K REG | DEN-ACTIVE |
| S4 | FETCH CONTENTS OF DESTINATION REGISTER | ADDS 20 + WP AGAIN; RESULT TO MA TO BE USED AS THE DESTINATION WRITE | READ CYCLE; ADDRESS (20 + WP) GOES OUT, CONTENTS OF THAT ADDRESS BACK IN TO BE USED FOR NEXT FETCH | DEN-ACTIVE |
| S5 | FETCH DESTINATION OPERAND | ADDS K PLUS ZERO AND STORES RESULT IN T REG. | READ CYCLE; DESTINATION ADDRESS FROM MA GOES OUT ON BUS 4; DEST. OPERAND COMES BACK ON BUS 4 INTO K REG. | DEN-ACTIVE |
| S6 | PERFORM THE ADD OPERATION FOR THIS INSTRUCTION, AND PRE-FETCH THE CONTENTS OF ADDRESS IN PC FOR THE NEXT INSTRUCTION | PERFORMS ADD OPERATION FOR CURRENT ADD INSTRUCTION; A INPUT IS FROM K, B INPUT FROM T VIA F, OUTPUT TO E DELAYED | READ CYCLE; ADDRESS FOR NEXT INSTRUCTION OUT VIA P BUS AND BUS 4; DATA BACK IN ON BUS 4 TO K REG, VIA BUS S | INCREMENT PC DEN-ACTIVE |
| S7 | WRITE RESULT OF THIS ADD OPERATION AT DESTINATION ADDRESS; CALCULATE SOURCE ADDRESS FOR NEXT INSTRUCTION | ADDS 25 + WP FOR NEXT INSTRUCTION | WRITE CYCLE; DESTINATION ADDRES FOR ADD INSTRUCTION GOES OUT ON BUS 4 FROM MA, THEN DATA ON TO BUS 4 FROM D REG. | LOAD IR VIA DI BUS AND DETERMINE ENTRY POINT FOR NEXT INSTRUCTION |

Fig. 7

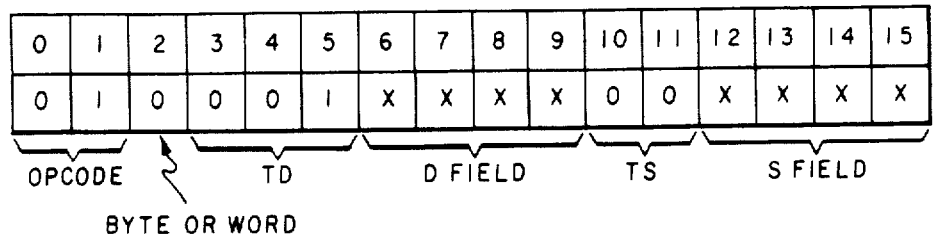

Fig. 7a

METHOD OF INTERNAL SELF-TEST OF MICROPROCESSOR USING MICROCODE

BACKGROUND OF THE INVENTION

This invention relates to a method of testing single-chip microprocessor devices, and more particularly to internal self-testing of microprocessors using microcode.

In manufacture of 16-bit microprocessor devices capable of executing a full instruction set, such as the device disclosed in U.S. Pat. No. 4,402,044, testing is a major factor of cost. The length of time a completed device must remain on the test machine to completely check out all possible failure modes becomes a significant investment. Even so, there are failures of the stuck fault type at inaccessable internal nodes, that might not be detected by any test patterns and algorithms executable in any reasonable time. Devices which test "good" using all practical tests might contain failure conditions not reached until actual operation in a system.

Testing methods for microprocessor devices are disclosed in U.S. Pat. No. 3,921,142 issued to J. D. Bryant et al; 4,024,386 issued to E. R. Caudel; and 4,158,432 issued to M. G. VanBavel; and in U.S. patent applications Ser. No. 276,421, filed June 22, 1981 by J. D. Bellay, K. D. McDonough, and M. W. Patrick; Ser. No. 280,048, filed July 2, 1981 by K. C. McDonough and J. D. Bellay and now U.S. Pat. No. 4,490,783 issued 12/25/84; and Ser. No. 350,961, filed Feb. 22, 1982 by S. S. Magar et al now abandoned all assigned to Texas Instruments. These show methods for reading out the ROM code, for example, or for actuating special test algorithms not used in normal operation. Also, it is known that internal nodes may be reached for test by a lengthy serial shift register connected to selected nodes in a test mode, so that certain conditions are set up by writing in, then the results read out by clocking these registers; this technique adds circuitry to the chip, and of course an existing design must be completely redone from a layout standpoint to accomodate the technique.

It is the principal object of this invention to provide improved circuitry and methods for testing single-chip microprocessor devices or the like. Another object is to improve the testability of a microprocessor device by employing microcode from the control ROM to set up special conditions of controllability and visability of internal nodes.

SUMMARY OF THE INVENTION

In one embodiment of the invention, a microprocessor device which is generally of the type shown in U.S. Pat. No. 4,402,044, is modified to provide self-test cababilities. In particular, microcode is added to the control ROM of the CPU to establish test states in response to externally-applied controls on test pins. This test microcode is not executed during normal operation of the microprocessor, but instead is only used by the manufacturer to test devices before shipping, or by the systems manufacturer to test incoming parts before using. The test microcode can quickly detect stuck faults in the internal logic because two data sources can simultaneously attempt to drive a single node, which is a condition avoided in standard microcode execution.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1 is an electrical diagram in block form of a one way communications loop of the token-passing type which may employ a microprocessor device having features of the invention;

FIGS. 1a and 1b are timing diagrams of data frame formats used in the communications loop of FIG. 1;

FIG. 2a is a diagram of the word, byte and bit definitions of the 16-bit data word used in the local CPU in the microprocessor device 20 of FIG. 2;

FIG. 2b is a memory map for the local memory including local RAM 22 and ROM memory 27 of the local CPU device of FIG. 2, and FIG. 2c is a diagram of a number of adjacent memory locations in the general memory area referred to as a "workpiece";

FIG. 7 is a state diagram showing conditions in the local CPU device of FIGS. 3 and 4 for an add operation;

FIG. 7a is a diagram of a sixteen bit instruction word for the add operation of FIG. 7;

DETAILED DESCRIPTION OF SPECIFIC EMBODIMENT

Token Ring Local Area Network System

Figure 2:
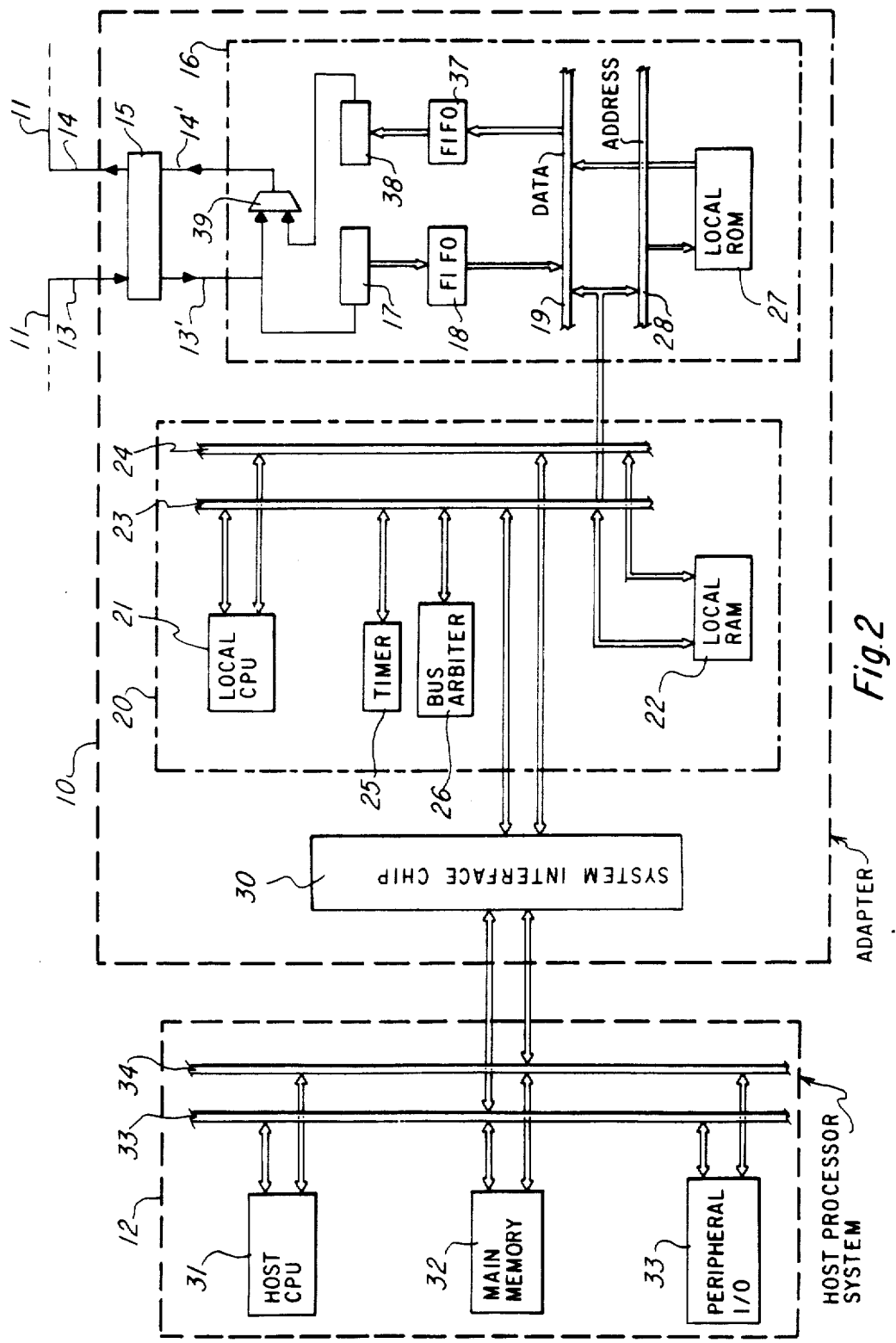
FIG. 2 is an electrical block diagram of one of the stations in the communications loop of FIG. 1, including a microprocessor CPU having features of the invention.

Referring to FIG. 1, a communications loop of the token ring type is illustrated. A plurality of nodes or stations 10 are interconnected by a one-way signal path 11. A host processor system 12 is connected to each station 10. Each one of these systems 12 may be a computer workstation with a CPU, keyboard, disk memory, CRT display, and printer, for example. Signals on the loop propagate in one direction, as indicated by arrows, either bit-serial as will be described herein, or byte-serial, depending upon the requirements of the system. The purpose of this communications loop is to provide high-speed data transfer between processing systems.

There is no central or master station in the loop; instead the loop operates on a peer-to-peer basis.

The communications loop of FIG. 1 is a local area network interconnecting stations 10 within a single office building, a building complex, or a campus, with the length of the signal path 11 being no more than a few kilometers. Using twisted-pair conductors for the signal path 11, data rates of about one to ten Mb/sec. are possible, and up to one or two hundred stations 10 may be connected in a single loop.

A control scheme based upon token passing is used for granting access to the ring of FIG. 1. A unique bit sequence, called a token, is passed from one station to the next. If a station has no data to transmit, the token is simply passed on to the next node. A station having data to transmit to another station 10 in the loop waits until the token is received, changes the token from "free" to "busy" and retransmits it, and transmits its data. After this transmitting station receives the message back at its input, confirming that its message has propagated around the loop, it retransmits the free token.

The communications loop of FIG. 1 operates according to the IEEE 802.5 standard for token ring local area networks. This type of system is described by Dixon, Strole and Markov in IBM Systems Journal, Vo. 22, Nos. 1 and 2, 1983, pp. 47–62; also, the system is described by N. C. Strole in IBM J. Res. Develop, Vol. 27, No. 5, Sept. 1983, pp. 481–496.

Each of the stations 10 has the capability of receiving data from the signal path 11 at its input 13, and transmitting data at its output 14. The data is transmitted on the twisted-pair signal path in the format of differential Manchester encoding. The data consists of a sequence of 8-bit groups or octets as illlustrated in FIGS. 1a and 1b. A free token consists of a one-octet starting delimiter, a physical control field which is two octets long, followed by an ending delimiter, as seen in FIG. 1a The physical control field contains priority codes which allow levels of priority in granting access, as well as the "token", which is 1 for busy and 0 for free. The starting and ending delimiters contain bits which are code violations in Manchester encoding so that the delimiters will not occur in any address or data fields.

A data frame is shown in FIG. 1b, and consists of a starting delimiter, a two-octet physical control field containing a busy token in this case. The next field is the destination address, six bytes in length; a single loop would need only one byte for a maximum of 256 stations 10, but provision is made in the protocol for a much larger number of unique addresses. A source address field of six bytes follows, representing the address of the transmitting station. The information field is next, and this field is of variable length, depending upon the number of bytes of data to be transmitted; an average message is perhaps two or three hundred bytes of ASCII code, but thousands of bytes may be sent in one frame. The data is followed by a four-octet frame check sequence which contains a CRC-code for checking the addresses and data for errors; the receiving station performs this check. The frame concludes in an ending delimiter, followed by a one-octet physical control field which contains bits modified by the receiving station as the frame passes through to indicate that the address was recognized and the frame was copied, and also whether errors were detected in the transmitted data.

A transmitting station does not reinsert the free token onto the loop until it has received the beginning of its transmitted frame back at its input. As soon as it has recognized the starting delimiter, physical control field, destination address, and source address, it transmits the free token and strips the remainder of its transmitted frame. Each of the stations 10 other than the transmitting and receiving stations merely passes the frame on, but does not copy it. A station 10 can perform the following operations on the data stream:

(a) if the destination address is not that of the station, it retransmits the data frame without copying it;

(b) if the destination address is that of the station, it retransmits the data frame and also copies it;

(c) the station can change the state of single bits in the received data (such as token or physical control fields) before retransmitting;

(d) a station can originate the transmission of data to another station;

(e) the originating station removes or strips a message frame from the ring that this station has previously transmitted, after the message has gone all the way around the ring; this originating station retransmits a free token after it has passed on the starting delimiter, physical control field (including busy token), and addresses.

Referring to FIG. 2, each of the stations 10 includes a ring interface 15 which converts the incoming signal on line 13 to the voltage level for internal processing, and recovers the signal clock $\phi s$ from the loop signals. The ring interface also produces the outgoing signal on the output line 14 at the proper voltage/current level, based upon a transmit signal on line 14'. The incoming serial data on line 13' applied to a protocol handler device 16 which is a single-chip integrated circuit which implements the functions (a)–(f) listed above. The serial data is converted to parallel data in a register 17, and if the data is to be copied to parallel data in a register 17, and if the data is to be copied the bytes of incoming data are coupled by a FIFO bufer 18 to a data bus 19.

A message processor chip 20, another single-chip integrated circuit containing a local CPU 21 and a local RAM memory 22, receives the incoming data by DMA to RAM 22 via local address/data bus 23 and local control bus 24. The message processor also contains a general purpose timer 25 and a bus arbitrator 26, both coupled to the local bus 23 and control bus 24. The programming for the local CPU 21 of the message processor 20 is contained within a ROM 27 which is accessed by address bus 28 and data bus 19, extensions of the local bus 23; the ROM 27 is located on the protocol handler chip 16.

The incoming data, copied into the local RAM 22 by DMA, is then copied into the host processor 12 by DMA through a system interface chip 30, which is another single-chip integrated circuit.

The host processor 12 contains the host CPU 31, a main memory 32, and various peripheral devices 33 which would couple to the CRT, keyboard, disk drive, etc. A main address/data bus 34, and control bus 35, interconnect these elements. The host CPU 31 may be a part number 68000, or a 8086 device, as the interface device 30 accomodates the control and data formats of either.

The host processor 12 sends a message to another host processor 12 of the communications loop by first forming a message frame in its RAM 32 with destination address, its own address, and the bytes of data to be sent as the message. This frame is copied into the local RAM 22 by DMA (or memory mapped I/O) through the system interface 30 and local bus 23. The message frame stays in the local RAM 22 until a free token is received and recognized by a decoder 36 in the protocol handler 16; when this occurs controllers in the protocol handler begin to fetch the frame from the local RAM 22 by DMA through local bus 23, data bus 29, and a FIFO 37, from which the data is serialized in a shift register 38 and goes out through a multiplex 39 to the output line 14'.

If the incoming data on the line 13' is not to be copied in this station, it does not reach the busses 29 or 23, nor the local RAM memory 22, but instead is applied through multiplexer 39 to the line 14'.

The Local CPU

Microprocessor devices with internal test of the invention to be described herein may be of various configurations; in this embodiment the microprocessor device takes the form of the chip 20 containing the local CPU 21 used in the system shown in FIG. 2.

The microprocessor device 20 is a single-chip MOS/-LSI debice having the local CPU or central processing unit 21 as will be described in detail, along with local a read/write static random access memory 22. The CPU 21 and memory 22 communicate with one another by a 16-bit, parallel, bidirectional, multiplexed, address/data bus 23, along with the control bus 24. Suitable supply voltage and clock terminals are included; for example the device may employ a single +5 V Vcc supply and ground or Vss, and a crystal may be connected to terminals of the device to control the frequency of an on-chip oscillator which will then define the local timing. It is understood that concepts of the invention may be used in various single-chip microcomputer or microprocessor devices with on-chip memory or off-chip memory, as well as in a microprocessor having separate address and data busses instead of the bidirectional bus 23.

In general terms, the local CPU 21 of FIG. 2 functions in traditional manner. The CPU 21 fetches an instruction by sending out an address on the bus 23 and bus 28 to the ROM memory 27 then receiving the instruction via the bus 19 and bus 23 from the addressed location in the ROM memory. The CPU 21 then executes this instruction, which usually requires several machine cycles (as defined by the clock or crystal) including sending out via bus 23 addresses for the operands stored in the RAM memory 22, and receiving this data back on bus 23, as well as writing a result into RAM memory 22 by applying an address followed by data in successive cycles on the bus 23.

In the example to be described in detail, a 15-bit address is applied to the bus 23 from the CPU 21 (the 16th bit is hardwired 0 for addressing), which will directly address 64K bytes or 32K words of memory in the RAM 22 and ROM 27 as seen in the memory map of FIG. 2b. Each 16-bit word in memory includes two 8-bit bytes, so the CPU addresses 64K bytes.

The local CPU 21 of FIG. 2 employs a memory-to-memory architecture in which the register files or working registers used by the CPU reside in the RAM memory 22. The RAM memory 22 is available for program or data storage, or for "workspaces" as seen in FIG. 2c. The first word of a workspace is addressed by a workspace pointer (always an even address) and the remaining fifteen words are addressed by the workspace pointer plus 02 up to 1E (a 4-bit binary address).

Definitions of the functions of the control lines 24, the status bits for a sixteen bit status register ST, and interrupt levels are similar to Tables of U.S. Pat. No. 4,402,044, incorporated herein by reference. Of course, this specific microprocessor is merely illustrative of contemporary microprocessors or microcomputers in which features of the invention may be used.

The CPU 21 of FIG. 2 executes the instruction set described in Table A and listed in Table B, although it is understood that other instructions could be defined for execution in addition to or in place of the particular ones described. Most of the instruction set of Tables A and B is the same as that of a microprocessor sold by Texas Instruments under the part number TMS9900 and described in a book entitled "9900 Family Systems Design", published in 1978 by Texas Instruments Incorporated, P.O. Box 1443, M/S 6404, Houston Tex. 77001, Library of Congress Catalog No. 78-058005; such book is incorporated herein by reference.

Figure 3:
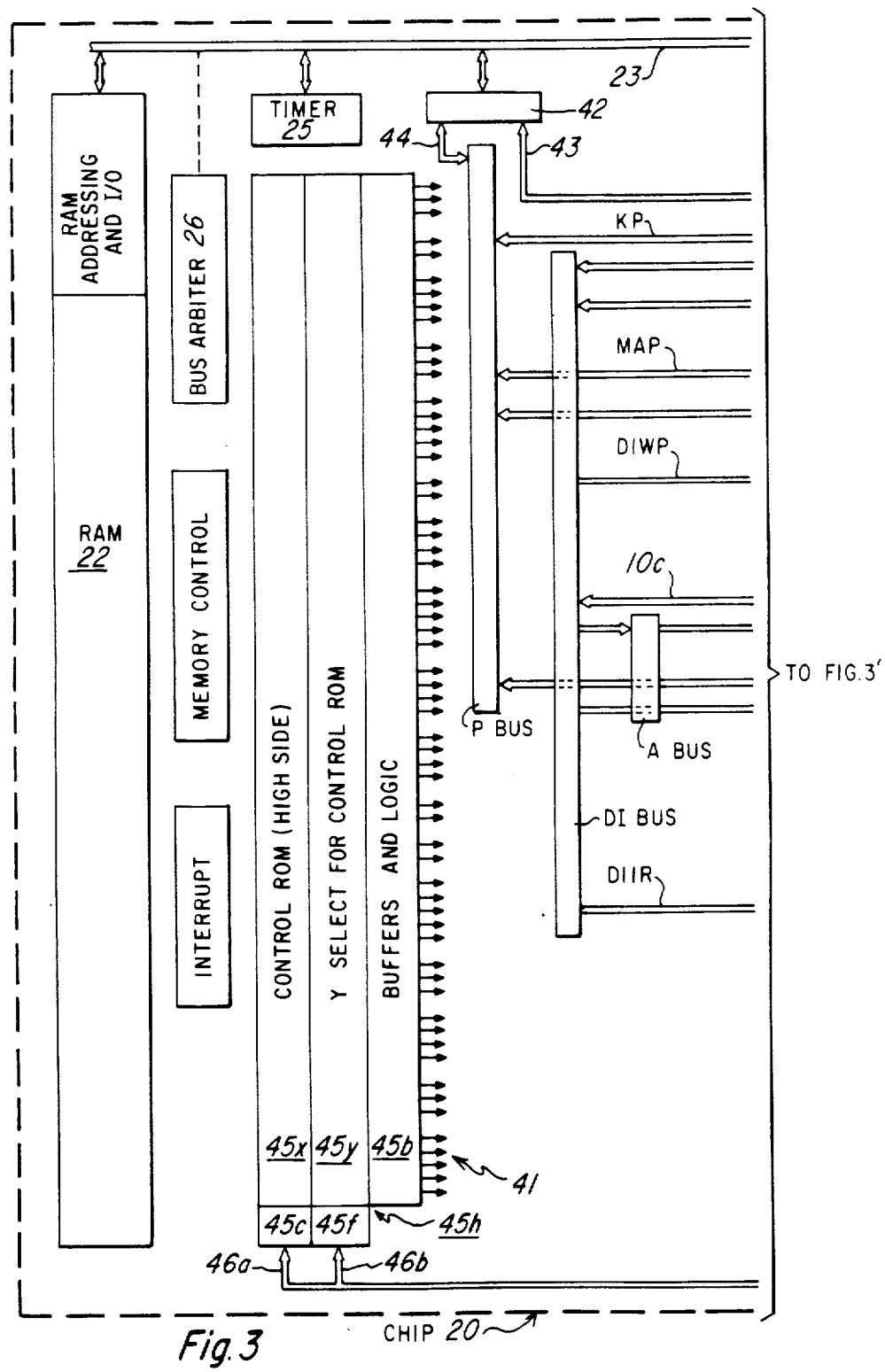
FIGS. 3 and 3a are an electrical diagram in block form of a MOS/LSI microprocessor chip including the local CPU or central processor unit employed as the microprocessor device 20 of FIG. 2 and utilizing features of the invention.
Figure 3A:
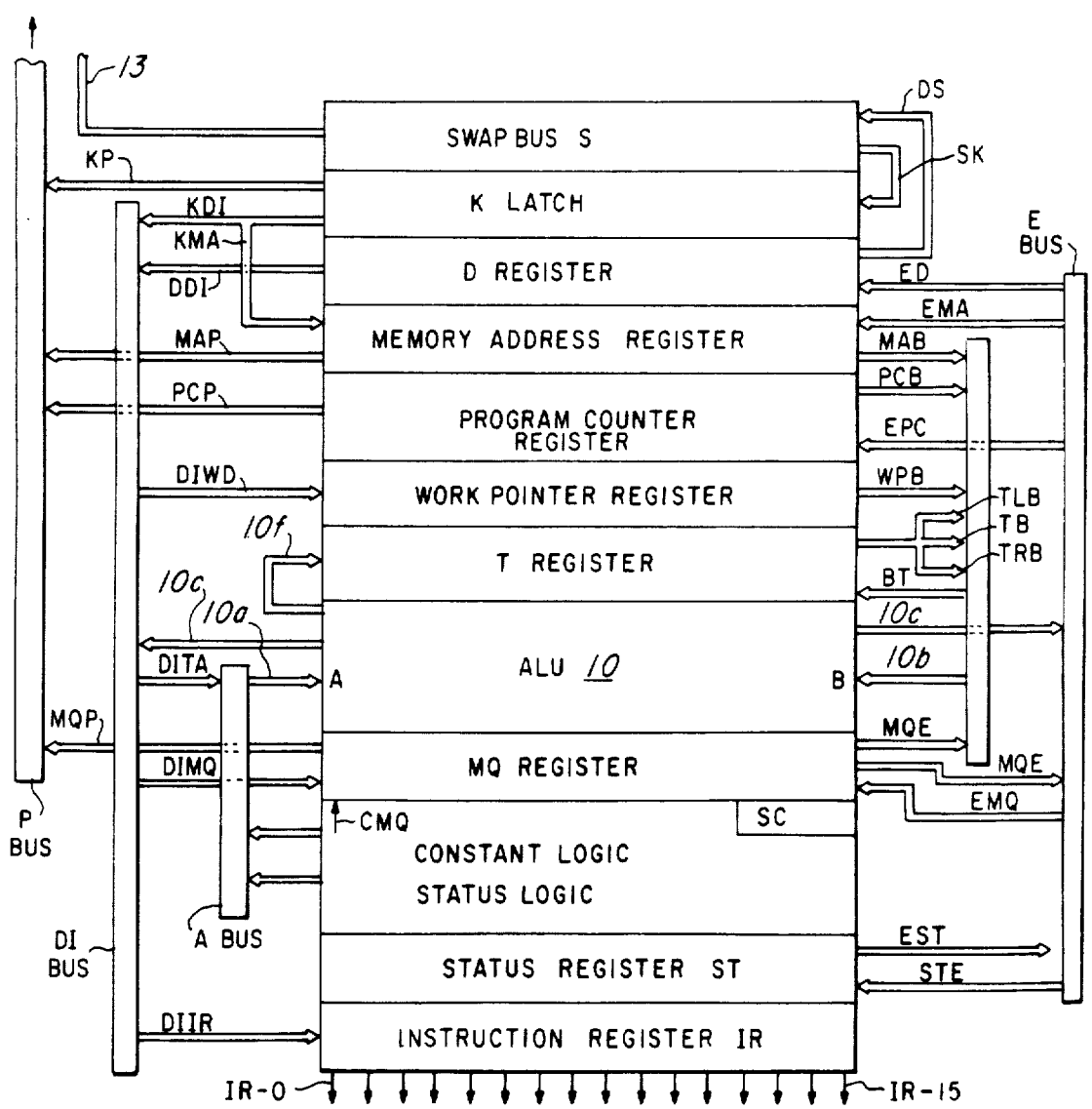
Figure 4:
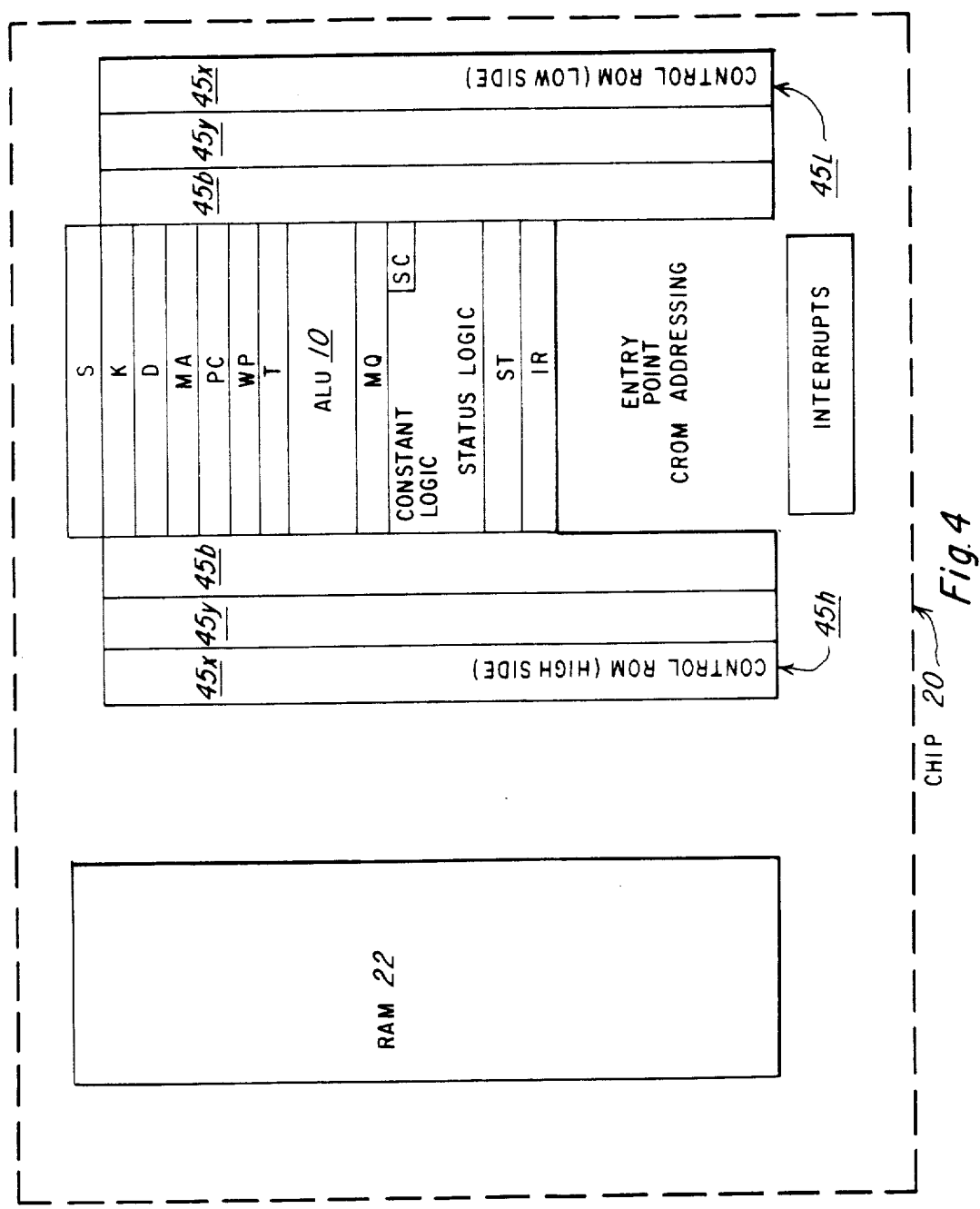
FIG. 4 is a greatly enlarged plan view of the semiconductor chip 20 containing the local CPU 21 of FIG. 3 showing the physical layout of the various parts of the device.
Figure 4A:
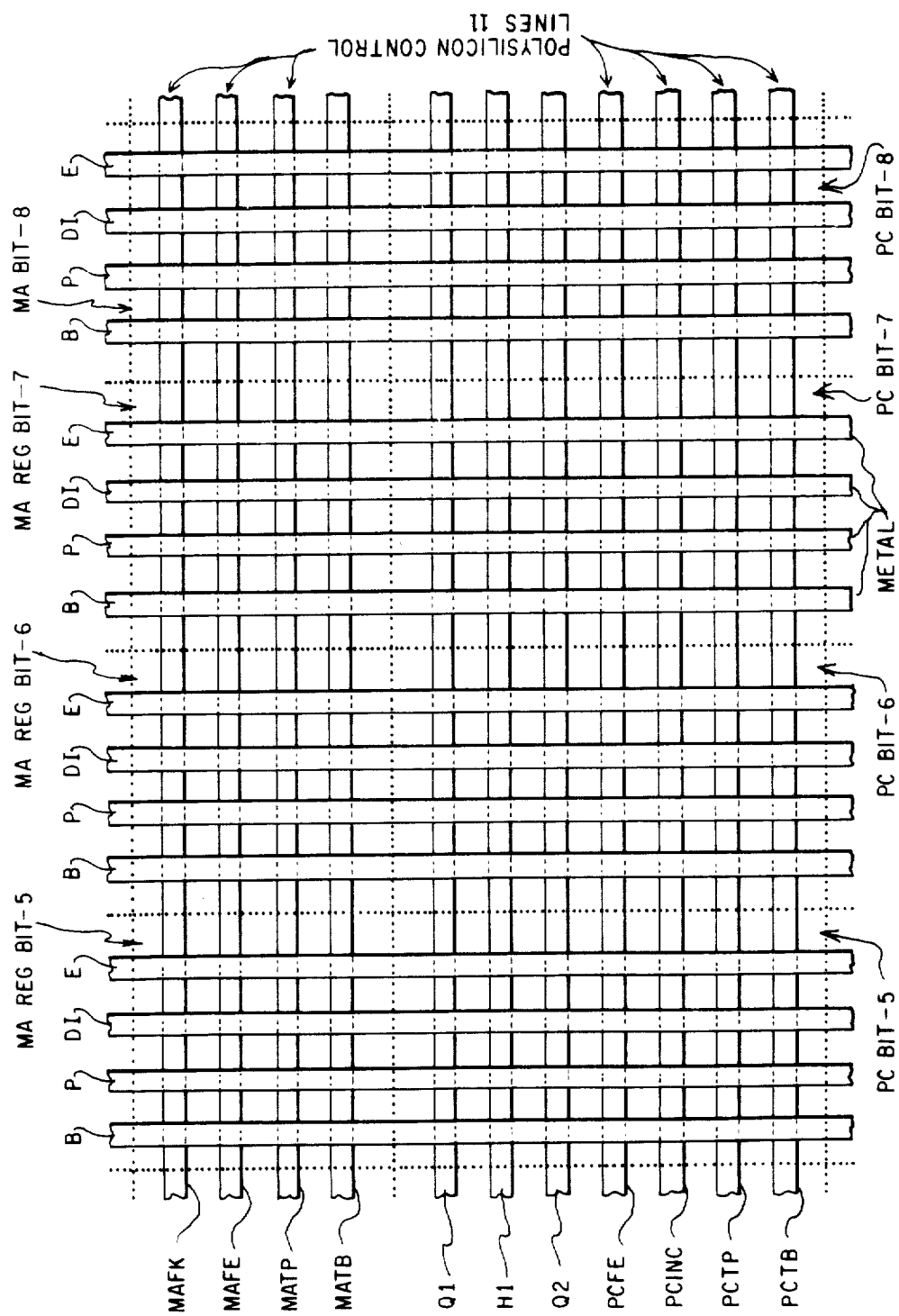
FIG. 4a is an enlarged detail view of a part of the layout of FIG. 4 showing the register strip.
Figure 5A:
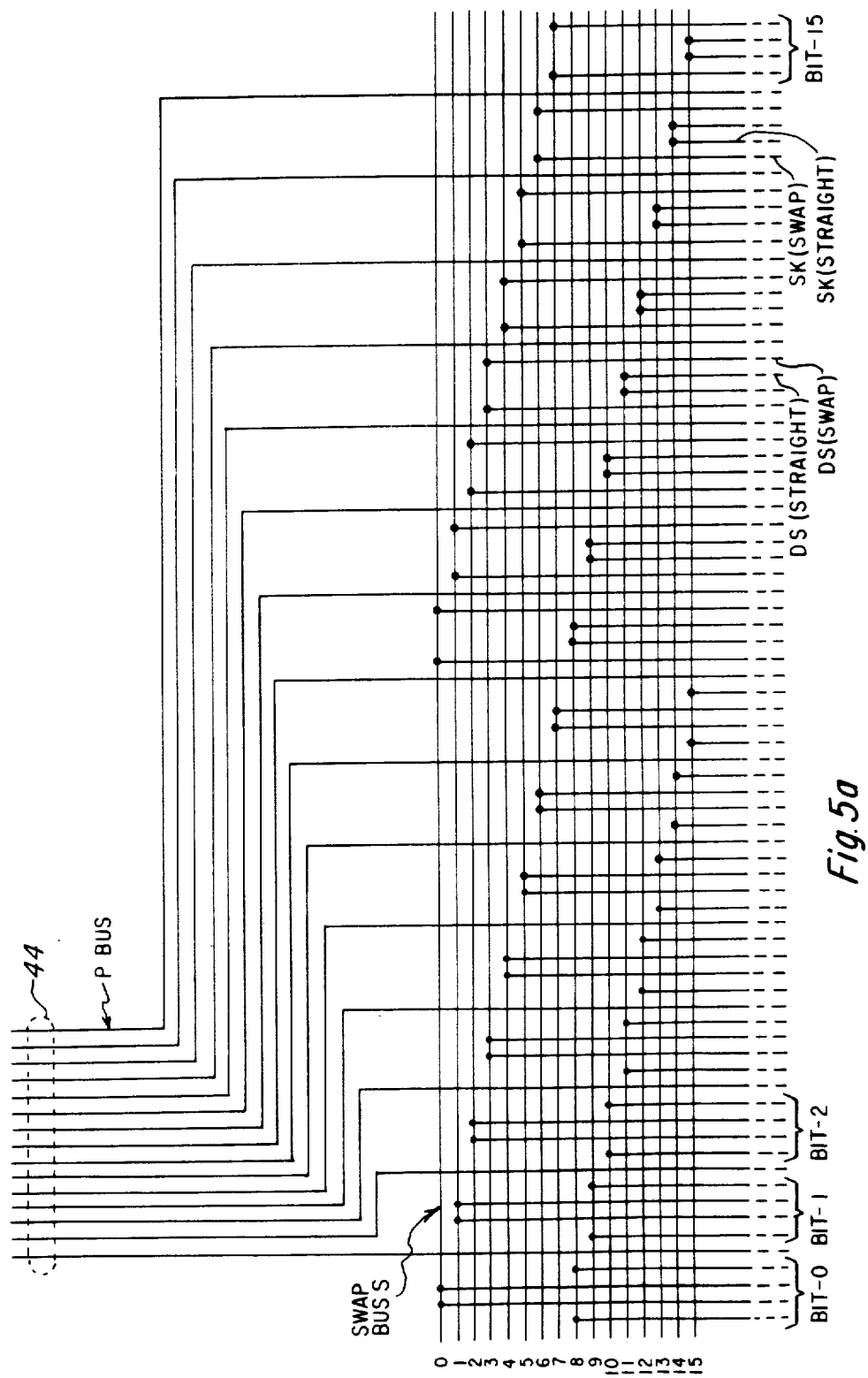
FIGS. 5a–5g are electrical schematic diagrams of various parts of the ALU and register strip within the microprocessor of FIGS. 3 and 4.
Figure 5B:
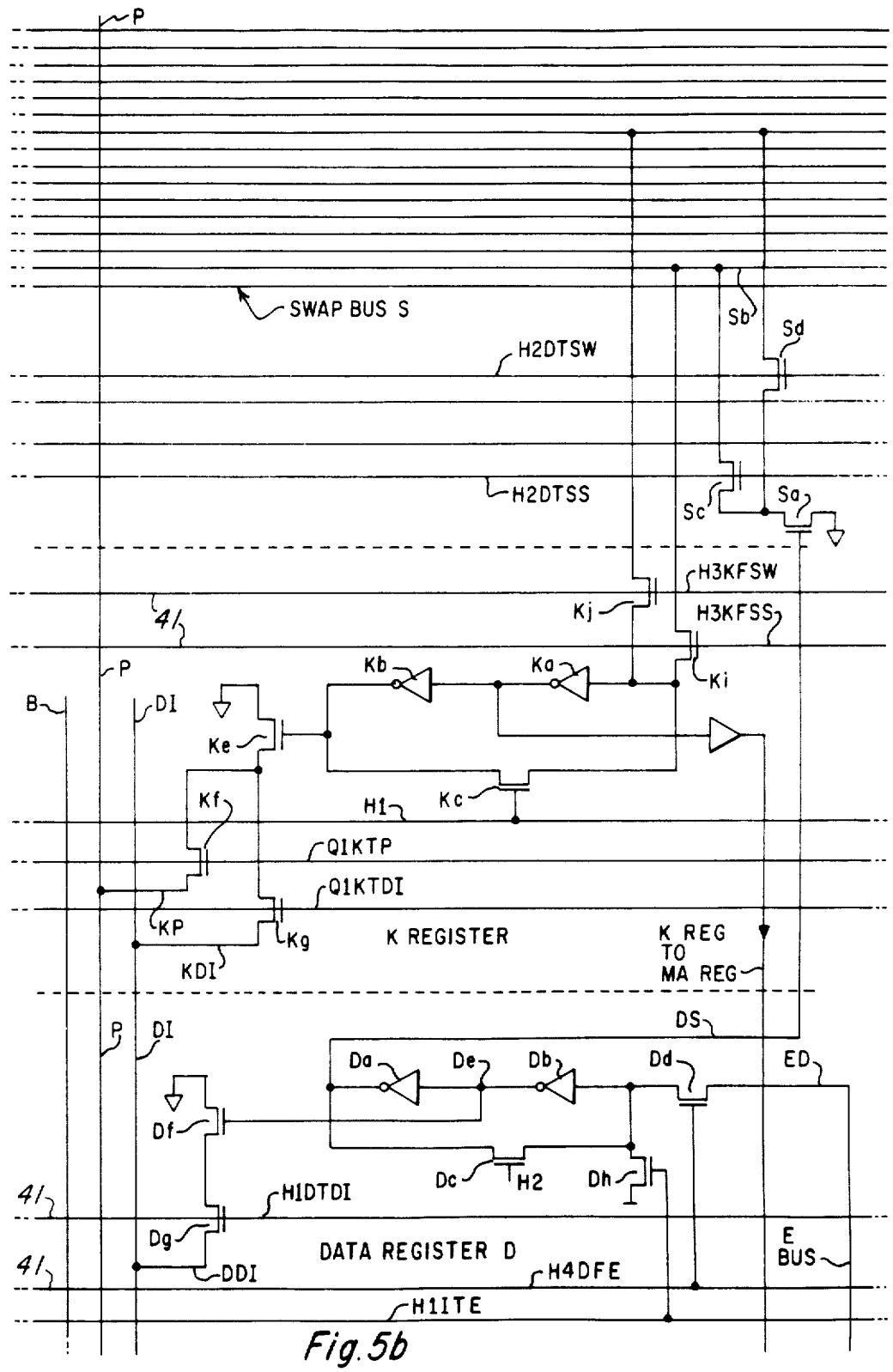
Figure 5C:
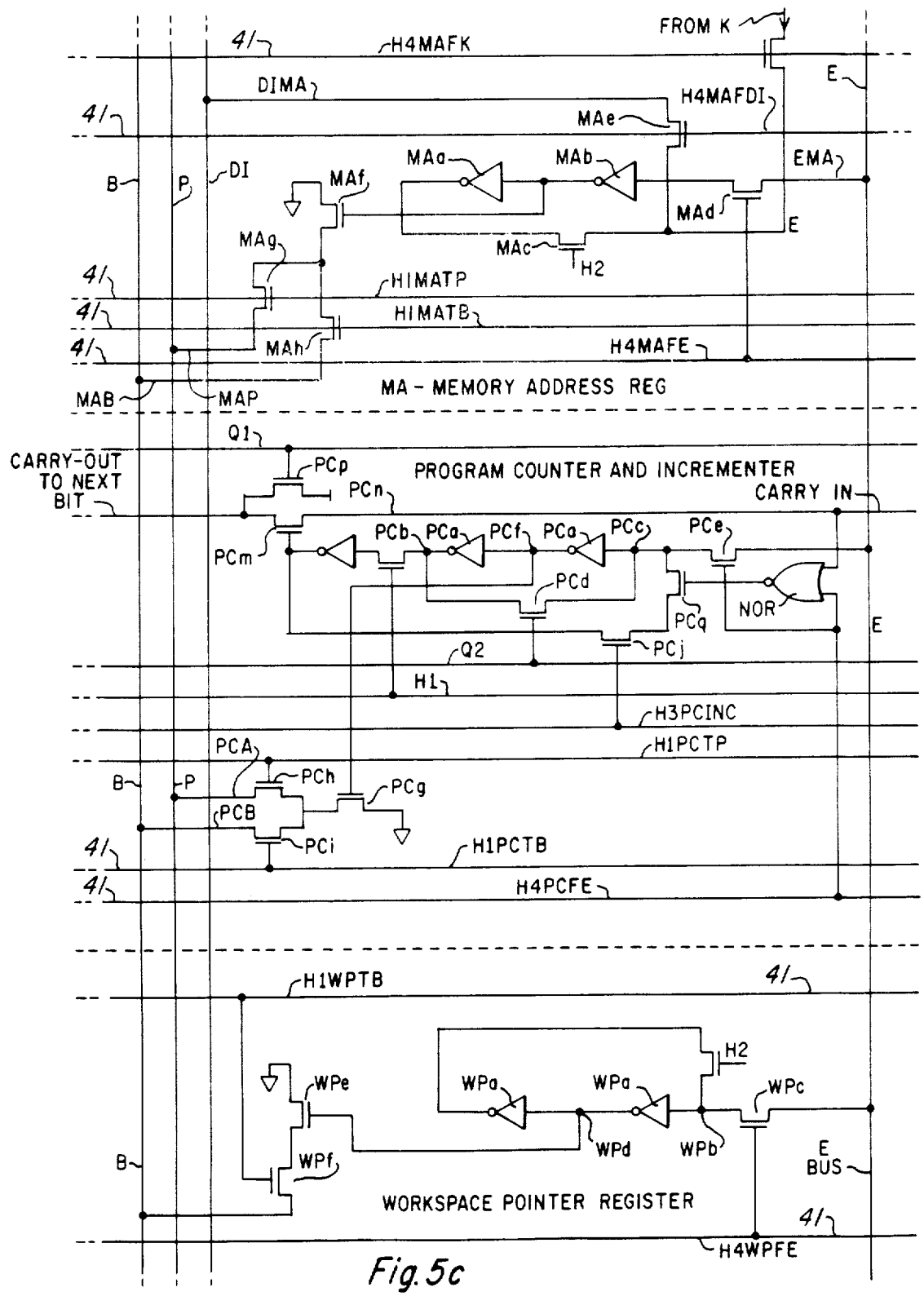
Figure 5D:
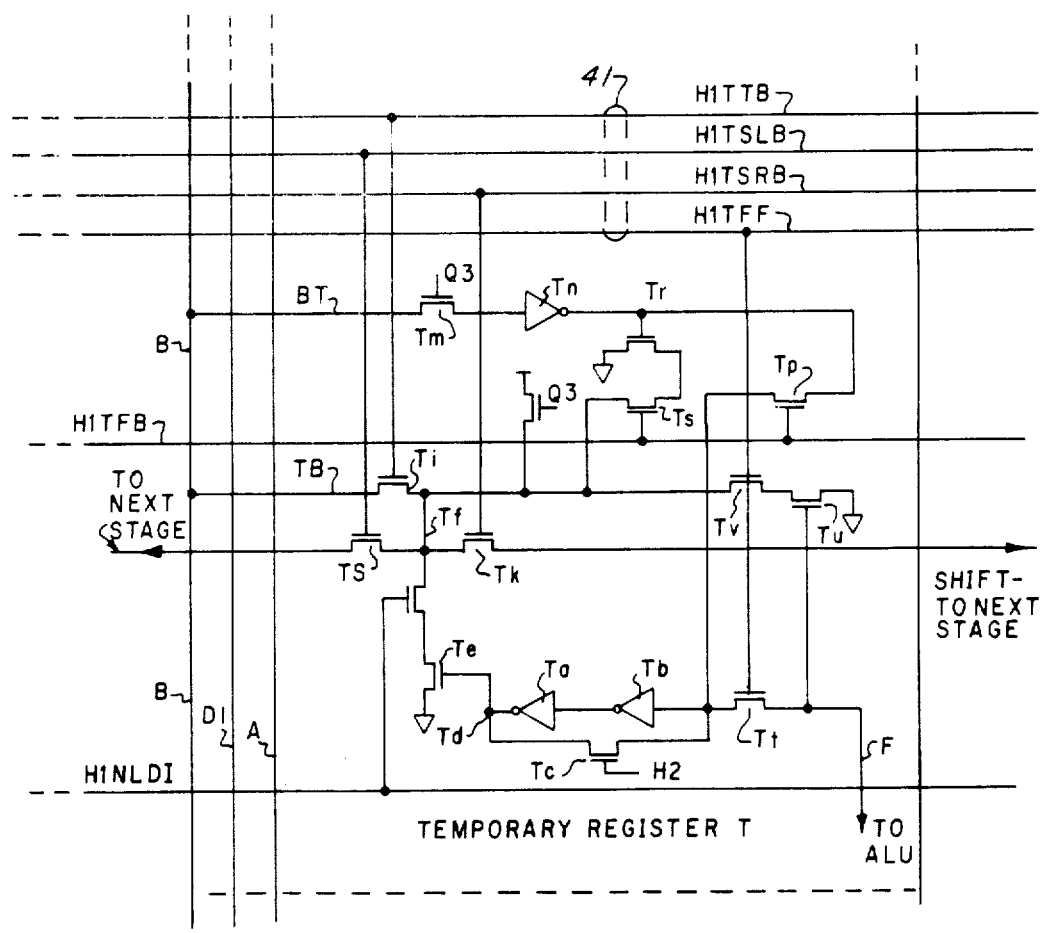
Figure 5E:
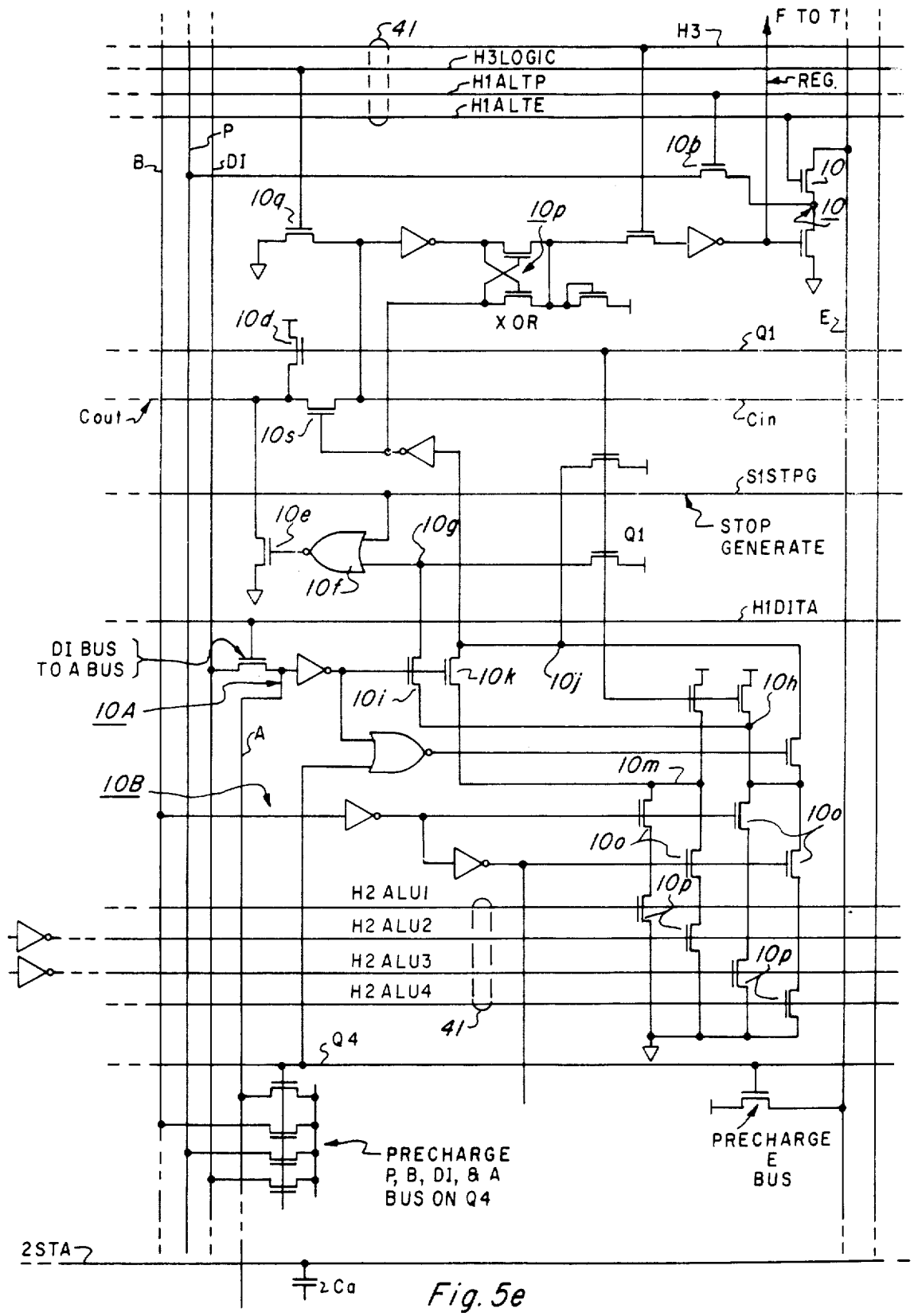
Figure 5F:
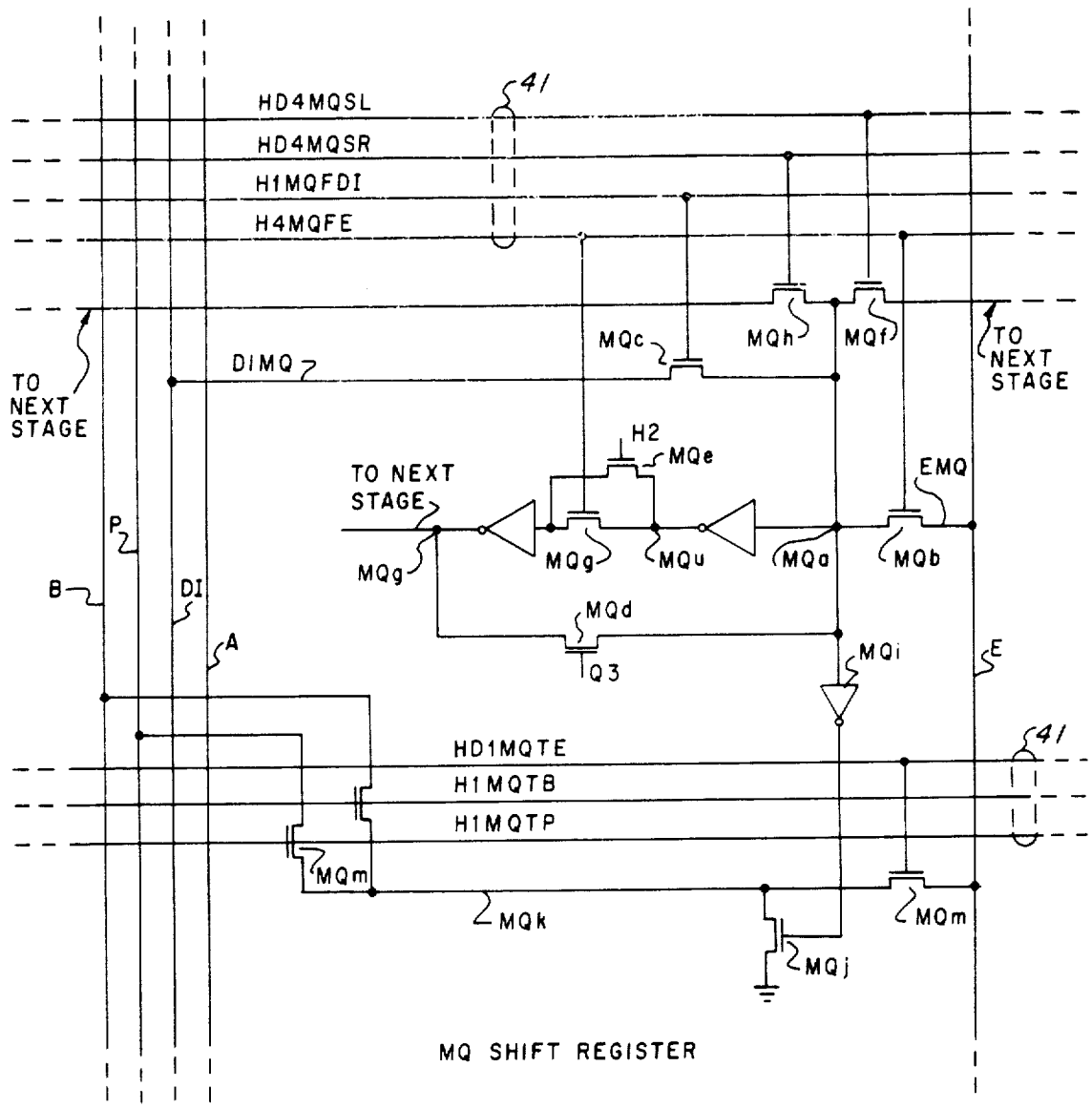
Figure 5G:
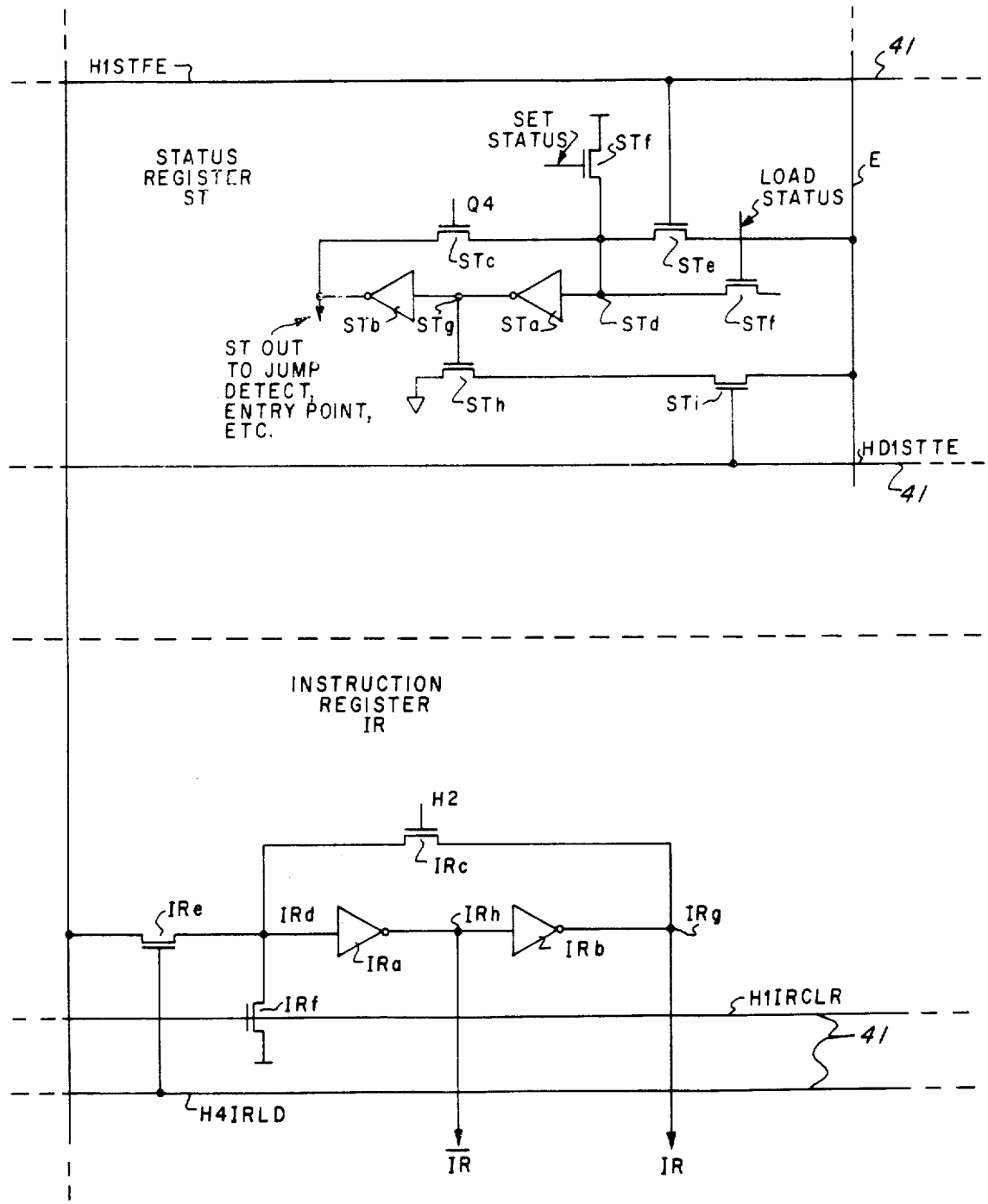
Figure 6:
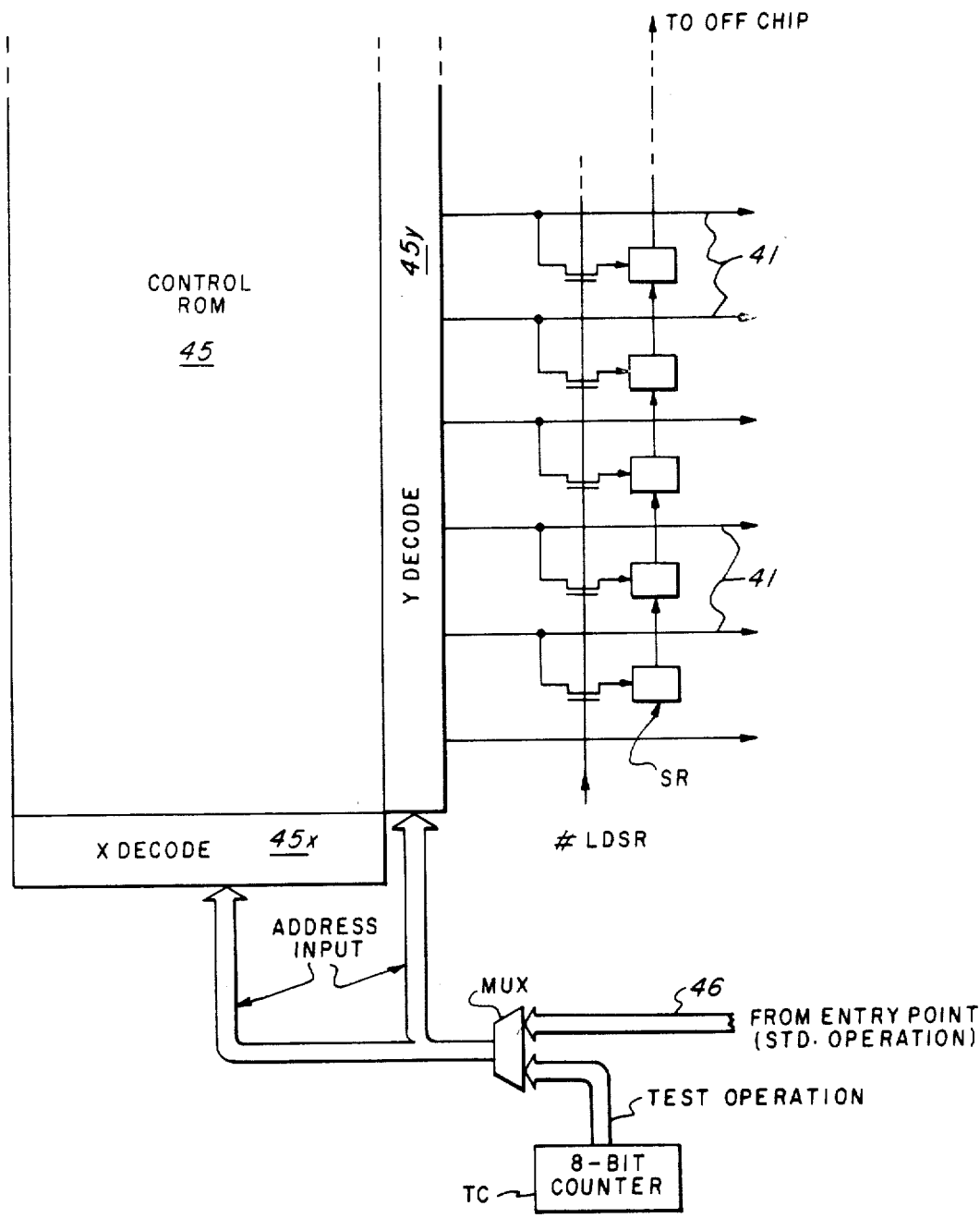
FIG. 6 is a schematic diagram of a control ROM used in the local 21 CPU of FIGS. 2, 3 and 4.

The processor architecture within the CPU 21 is shown in block diagram form in FIG. 3, in chip layout form in FIGS. 4 and 4a, and in logic diagram form in FIGS. 5 and 6. Generally, the CPU includes an ALU or arithmetic logic unit 40 along with it associated registers, controls, data paths and related logic circuitry.

The ALU 40 consists of sixteen parallel binary adder/logic stages which function as the computational component of the processor. The ALU 40 receives a 16-bit input 10A and a 16-bit input 10B to produce a 16-bit parallel output 10C. The input 10A of the ALU is from a 16-bit parallel A bus. The data on these internal busses is active low; the indicators A, A−, or NA should be used in referring to the bus data to be technically accurate. The A bus may receive data from any one of several sources, with selection of inputs being made by microcode control inputs 41. Similarly, the input 10B is from a 16-bit parallel B bus which may receive data from any one of several sources as defined by control inputs 41. The output 10C from the ALU 10 goes to either a P bus or an E bus under control of microcode bits on lines 41. The ALU performs all the arithmetic and logic functions required to execute microinstructions in the CPU such as the functions of addition, subtraction, AND, OR, exclusive OR, complement, etc., as needed to execute the instructions of Table A.

The CPU 21 has a number of registers associated with the ALU 40, only three of which are accessable to the programmer. These three are a program counter or PC register, a workspace pointer or WP register, and a status register ST. Other internal registers which are used during the acquisition or execution of instructions are inaccessable to the programmer.

The program counter PC is a 15-bit counter that contains the word address of the next instruction following the instruction currently executing. The fifteen stages are left-justified with the 16th bit hardwired to 0; instructions in the memory 27 are constrained to word boundries, so a single byte is not accessed; only even addresses (words) can be used. The CPU 21 uses the address in PC to fetch the next instruction from ROM memory, then program counter PC increments while the new instruction is executing. If the current instruction in the CPU 21 alters the contents of the program counter PC, then a program branch occurs to the location in ROM memory specified by the altered contents of the program counter. All context switching operations, such as interrupts, plus simple branch and jump instructions, change the contents of the program counter. The program counter can be loaded from the E bus by lines EPC, or its contents applied to the B bus via lines PCB, or alternatively to the P bus via lines PCP. All such transfers to or from the program counter are defined by microcode control inputs 41, of course. Internally, the program counter PC includes binary add circuitry to add one to the count contained in the 15-bit register at the proper time, again under control of an input 41.

The status register ST is a 16-bit register that contains the results of comparisons, indicates status conditions, and supplies interrupt mask level to the interrupt priority circuits. Each of the sixteen bit positions in the status register signifies a particular function or condition that exists in the CPU 21; these bit position assignments are shown in the U.S. Pat. No. 4,402,044. Some instructions use the status register ST to check for a prerequisite condition; others affect the values of the bits in the register; and others load the entire status register with a new set of parameters. Interrupts also modify the status register. All sixteen bits of the status register ST may be loaded form the E bus via lines EST or loaded onto the E bus via lines STE, upon a command on the control lines 41.

The CPU 21 uses blocks of words in its local RAM 22, called workspaces, for instruction operand manipulation instead of internal hardware registers. A workspace occupies sixteen contiguous memory words as in FIG. 2c, in any part of local RAM 22 that is not reserved for other use. The individual workspace registers may contain data or addresses, and fucntion as operand registers, accumulators, address registers, or index registers. A large number of these 16-word workspaces may exist in the 32K words of the memory address space, providing a high degree of program flexibility. To locate the workspace in local RAM 22, the hardware register called the workspace pointer WP is used. The workspace pointer WP is a 15-bit register (left justified with 16th or LSB hardwired to 0) that contains the memory address of the first word in the 16-word workspace as illustrated in FIG. 2c.

The CPU 21 accesses any register in the workspace of FIG. 2c by adding twice the register number R to the contents of the workspace pointer WP and initiating a memory fetch for that word. The 16th bit is zero so this is equivalent to adding two times the register number to WP. FIG. 2c illustrates the relationship between the workspace pointer and its corresponding workspace in memory. The WP register is loaded onto the B bus via lines WPB, or loaded from the DI bus via lines DIWP, under command of certain control lines 41 from the control ROM.

This workspace concept is useful during operations that require a context switch, which is a change from one program to another, as in the case of a subroutine or an interrupt. In a conventional multi-register CPU, executing a context switch requires that at least part of the contents of the registers file be stored and reloaded, requiring a memory cycle to store or fetch each word. The CPU 21 accomplishes this operation merely by changing the contents of workspace pointer WP. A complete context switch requires only three store cycles and three fetch cycles, exchanging the program counter PC, status register ST, and workspace pointer WP. After the switch, the workspace pointer WP contains the starting address of a new 16-word workspace (FIG. 2c) in local RAM 22 for use in the new routine. A corresponding time savings occurs when the original context is restored. As seen in Table A, instructions in the CPU 21 that result in a context switch include: Branch and Load Workspace Pointer (BLWP), Return from Subroutine (RTWP), and an Extended Operation (XOP) instructions; these are in addition to device interrupts, the arithmetic overflow interrupt, and others which also cause a context switch by forcing the CPU to trap to a service subroutine.

The internal registers not accessable to the user (programmer) in the CPU 21 include a memory address or MA register, a data or D register, and a K register. The D register is connected as input to a swap bus S via parallel lines DS, and a swap bus output on lines SK may be applied to th K register, all under control of microcode commands on the lines 41 from the control ROM. The D register functions principally as a data output latch, and is loaded from the E bus via lines ED. The D register is applied to a DI bus by sixteen parallel lines DDI. The data path from the output 10C of the ALU to the E bus and thus to the D register via lines ED, then to the DI bus via lines DDI and the A input of the ALU via the A bus is useful in divide routines, for example. Primarily, however, CPU output data is loaded into the D register from the E bus, then to swap bus S via lines DS, and then to sixteen address/data buffers 42 via lines 43, and thus to the local address/data bus 23. Data can be transferred onto the swap bus S straight or swapped, depending upon factors like byte operations being performed; these transfers are of course under control of microcode commands on lines 41.

The address/data buffers 42 are sixteen bidirectional, tristate buffers of conventional form, each having an input/output terminal connected to one of the local bus lines 23. These buffers usually receive addresses from the P bus via lines 44, or data via lines 43, for output to the bus 23; for input to the CPU 21, program or data words are applied via lines 43 to the swap bus S, thence to the K register via lines SK. It is also possible to load the P bus from the K register via lines PK, under a microcode command on a line 41, and thus output the K register via the P bus.

The addresses to local memory 22 or the ROM 27 are usually sent out from the CPU 21 via the P bus which is loaded by sixteen lines MAP from the MA register. The bits in this register can also be transferred to the B bus via parallel lines MAB, thus to the B input 10B of the ALU; alternatively the MS register may be loaded from the E bus via lines EMA or from the K latch via lines KMA, all as defined by microcode control lines 41.

Another internal register transparent to a user is the temporary or T register. This register receives a 16-bit parallel output 10F from the ALU 40, and applies its output to the B bus in three ways: either directly via lines TB, shifted left via path TLB or shifted right via path TRB. The T register can also recieve the B input 10B to the ALU delayed by ¼ of a clock cycle by a path BT. The T register provides an important function in executing microcode for multiply and divide operations.

A register also used in multiply and divide operations is referred to as the MQ shift register (for multiplier/quotient). This register has the capability of right shift or left shift by microcode commands on lines 41. The reigster may be loaded from the A bus or the DI bus by 16-bit parallel lines AMQ and DIMQ, or may be outputted to the E bus or the B bus via lines MQE or MQB.

An instruction register IR provides the usual function of containing the current instruction, the instruction being executed during a given microcode state time (machine cycle). The instruction register IR is loaded from the DI bus via lines DIIR, or may be loaded into the E bus via lines IRE, under microcode control via lines 41. Various fields of the instruction going to IR also can go to a bus by 2-bit and 4-bit connections IR2 and IR4. During each cycle, however, the contents of the instructions register IR are transferred via sixteen parallel lines IR0-IR15 to entry point and microcontrol generator circuits as well as miscellaneous control circuitry.

The microcode control signals 41 are generated in a control ROM 45 which is in this case split into two halves, 45H for the high side and 45L for the low side of the ALU and registers. Since there are many controls 41 used on only part of the bits, high or low, rather than all sixteen, space is saved by splitting the control ROM 45 in this manner. Each half of the control ROM has an X array 45X and a Y-select array 45Y. Buffers 45B for each of the lines 41 receive the select outputs from the Y array 45Y and introduce clocks or other logic as may be needed to produce the controls in the lines 41. The number of microcontrol lines 41 is about 130, depending upon the instruction set (Table A) to be implemented, well within the addressing range (256) of an 8-bit address on lines 46 that go to both sides 45H and 45H. The first of these 8-bit control ROM addresses on lines 46 is generated by entry point logic, and subsequent ones by a microjump circuit for executing a given instruction. Microjump addresses, produced on eight lines 47 which recieve outputs 41 from the control ROM, can generate a jump address for the next state. The microjump address on lines 47 is fed back to a logic array 48 that can also generate an entry point from inputs received from an execute entry point array 49E or a source/destination address entry point array 49A. A group detect circuit 50 receives the 16-bit instruction word from IR as well as status bits from ST and other controls and produces two inputs to the entry point arrays 49A and 49E, first a group identification and second a field. The group is determined by the left-most 1 of the opcode as seen in Table B, and the field is three or four bits starting after the left-most 1. The address to the control ROM 45 on the lines 46 may also be held in an 8-bit latch 51 so the same state is re-executed as in multiply or divide instructions; to this end a 4-bit state counter SC is provided which counts microcode state-times up to sixteen, and an overflow output of the state counter SC can control release of the holding latch 51. Thus, standard operation of the processor (as distinguished from test mode as will be described) is controlled by instructions loaded into the IR register to generate an entry point via group detect 50 and logic arrays 48, 49A, 49E; the entry point is a starting address for the control ROM 45 entered on address lines 46. This address results in a specific set of microcode commands on the control lines 41; some lines 41 will be active and most not. The address may also produce a jump address on lines 47 to define the control ROM address for the next microcode state, or the next state may be another entry point, or may be the same state due to the holding latch 51. When the last state needed for the instruction is reached, the next instruction is loaded into register IR and another entry point derived.

Interrupt codes received by the CPU 21 are applied to interrupt control circuitry 43. Bits 12-15 from the status register ST are also applied to the circuitry 43 to provide the interrupt mask for comparison with a interrupt code from external.

The control bus lines 24 are connected to control generator circuitry 44 which responds to lines 41 from the control ROM as well as to other conditions within the chip, and to the lines 24, to produce the necessary controls internal to the CPU and external to the CPU (on control bus 24).

A feature which aids in the test method is that the ALU 40 and its associated registers K, D, MA, PC, WP, T, MQ, ST and IR as described above are laid out on an MOS/LSI chip in a regular strip pattern as seen in FIG. 4a. Each of these registers as well as the ALU contains sixteen bits or stages which are laid out in a pattern like memory cells, the bits of the registers arranged in parallel lines, and the busses perpendicular to these lines. The A, B, DI, E and P busses of FIG. 3 are each sixteen parallel metal strips on top of the cells of the ALU 40 and registers (rather than beside the registers aa depicted in FIG. 3), and all of the dozens of control lines 41 are perpendicular to the metal busses and composed of polysilicon lines since they function as the control gates for transistors in the ALU 40 and registers of the CPU. The space needed in the control ROM 45 to generate the controls is about the same as the space needed for the controlled circuitry. This layout arrangement is advantageous when used with the "wide-word" control ROM or decoder of U.S. Pat. No. 4,402,043 because it fits alongside the control ROM with little wasted space for routing conductors. That is, almost all bus lines A, B, DI, E and P etc., and all control lines 41 are routed over or under functional regions or cells of the chip rather than over unused silicon, and almost all 90 degree turns are produced inherently at functional cells rather than in conductor routing. The enlarged view of FIG. 4a shows a small part of the ALU 40 and registers, illustrating the regular pattern of metal bus lines and the polysilicon control lines 41 for an N-channel silicon gate MOS device made generally according to U.S. Pat. No. 4,055,444, assigned to Texas Instruments.

It is significant to note that most of the connecting lines such as KDI, ED, EMA, MAB, DINP, etc. as mentioned above are not physically lines or elongated conductors at all but instead are merely metal-to-silicon contact areas along the metal bus lines of FIG. 4a. That is, routing of 16-bit parallel conductors is minimized by the strip feature.

The ALU and Register Circuits

The detailed circuits employed in the ALU 40 and its associated registers will be described with reference to FIGS. 5a-5g. These circuits fit together as seen in FIG. 3. Generally, only one bit of the sixteen bits is shown in a strip. For the most part the remaining fifteen bits are the same as the one shown in detail, with some exceptions.

The ALU

Referring to FIG. 5e, one of the bits of the ALU 40 consists of a complex logic circuit having its input 10A connected to the A bus and its inputs 10B connected to the B bus while its output 10C is connected by transistors 10a and 10b to the E and P busses. respectively. The transistors 10a and 10b have connected to their gates control lines 41 labelled H1ALtE and H1ALtP, respectively. In this description, the convention used for labelling commands or control lines 41 is (a) clock phase such as H1 or "half 1", then (b) the source such as "AL" (for ALU), and (c) "t" or "f" for to or from, followed by (d) the destination such as "P" or "E" bus. The half and quarter clocks are shown in the timing diagram of FIG. 2d. Using this convention, H1ALtP means this control 41 occurs during the H1 or half-1 clock and defines the connection from ALU to the P bus. An input to the A bus from the DI bus by line DIA and transistor 10c is controlled by the H1DItA command on a line 41, translating as "DI to A, on H1 clock". Carry-in and carry-out for this bit are on lines Cout and Cin respectively, which are connected to adjacent stages of the ALU. The carry-out line is precharged to 1 or Vcc on Q1 by transistor 10d, then conditionally discharged after Q1 goes low by a transistor 10e. A NOR gate 10f drives the gate of the transistor 10e based upon a S1STOPG input on one of the control lines 41 (meaning stop generate, on S1), and the voltage on a node 10g. The output of gate 10f is the carry generate condition, and is made unconditionally 0 if STOPG is active. The node 10g, precharged to 1 on Q1, is connected to a node 10h by a transistor 10i which has the inverted A input on its gate. Similarly, in the carry propagate circuit a node 10j is precharged to 1 on Q1 and is connected by a transistor 10k (also receiving inverted A input) to a node 10m. The nodes 10h and 10n, precharged to 1 on Q1, are conditionally discharged by complex NAND/NOR logic circuit including transistors 10o driven by the B and B input (inverted and twice-inverted), along with transistors 10p driven by the four control lines 11 labelled ALU1 to ALU4 (all valid on H2). The four controls ALU1-ALU4 define the operation performed in the ALU as set forth in Table C. The "H3Logic" control on a line 41 is the arithmetic/logic control; when this line is high the ALU performs logic functions by unconditionally grounding the Cin line by transitors 10q, but when low Cin is applied to an input of an exclusive NOR circuit 10p, the other input being the inverted propogate signal from node 10j. The propagate signal also drives the gate of a transistor 10s in conventional manner.

A carry input to the LSB of the ALU 40 is produced by microcode controls 41. A CIfCO or "carry-in from carry-out" control applies the carry-out from the MSB of the prior state to the carry-in at the LSB for the circuit state. A STCIN control applies the status bit-3 to the carry-in. A CIN control produces an unconditional carry in to the LSB.

The Workspace Pointer Register

A detailed circuit diagram of the workspace pointer register WP is shown in the lower part of FIG. 5c. This register includes two static inverter stages WPa with an input node WPb connected to the output for feedback during H2. The input node can be loaded from the DI bus by a transistor WPc having an H4WPfDI (WP from DI, on H4) command on its gate. An intermediate node WPd is connected to the B bus via an inverter WPe and a transistor WPf which ha a command H1WPTB (WP to B on H1) on its gate. Fifteen bits are exactly the same, and bit sixteen is a hardwired 0 or Vss.

In addition to functioning as the workspace pointer, the register WP is used as the B input to the ALU 40 when generating the source and destination addresses for typical instructions of Table A. In a context switch, WP is saved by writing into memory 22, and the path for this operation is the B input of the ALU 40 and the P bus. WP is loaded from off-chip by the DI bus.

The Program Counter and Incrementer

Also seen in FIG. 5c, the program counter PC consists of a pair of static inverters PCa having an output node PCb connected to an input node PCc on Q2 by a transistor PCd. The input node PCc may be loaded from the vertical E bus by a transistor PCe having H4PCfE (PC from E, on H4) on its gate; this signal is on one of the control lines 41 running horizontally through the register matrix. The output of the program counter at an intermediate node PCf is connected to the gate of a transistor PCg, from which the program counter contents may be read out onto the vertical P or B busses by transistors PCh or PCi and lines PCP or PCB. The signals to control these transfers are H1PCtP (PC to P, on H1) and H1PCtB (PC to B, on H1) on separate horizontal control lines 41. The program counter is incremented when an H3PCINC signal appears on one of the control lines 41, turning on a transistor PCj; on H1 a transistor PCk turns on, loading the contents of this bit of the program counter onto the gate of a transitor PCm in series with a carry line PCn from the prior bit. Each bit of the carry path is precharged to 1 on Q1 by a transitors PCp. The carry-in for each bit on line PCn is connected by a NOR gate to the gate of a transistor PCq; the NOR gate also has the H4PCfE signal as one input. This circuit causes a carry to be propogated if the bit is 1 and carry-in is 1; or causes the bit to go from 0 to 1 if the carry-in is 1. The LSB stage is a hardwired 0 because only the 15-bit word address is sent out on the bus 4; the 16th bit is the byte address which is not used for access. For byte operation using the odd numbered byte, the next lower even number is the address then the byte swap circuitry S is activated. Thus, the 16th bit of the address is always 0 All the other fifteen bits are identical to that shown in FIG. 5c. The carry-out from the last bit is truncated as it would represent address FFFF (in hex).

The Memory Address Register:

One bit of the MA register is seen in detail in the upper part of FIG. 5c. This register includes a pair of standard inverters MAa and MAb in each of the sixteen bits with feedback by a transistor MAc clocked on H2. The register is loaded from the E bus via sixteen separate lines EMA and a transistor MAd in each line. The gates of the sixteen transistors MAd are driven by a signal H4MAfE (MA from E, on H4) on one of the horizontal control lines 41. Likewise, each MA register bit is loaded from the K latch by a lines KMA and a transistor MAe which has H4MAfK on its gate. Output from the MA register is taken at an intermediate node between the two inverters which is connected by a transistor MAf to two output transistors MAg and MAh. An H1MAtP command on one of the control lines 11 turns on the transistor MAg and connects the output to the P bus via line MAP. An H1MAtB command turns on the transistor MAh and connects the output to the B bus via the line MAB. Of course, it is understood that there are sixteen of each of the input and output lines to or from the busses, as is true for the other registers.

The MA register is usually loaded via P bus to the A/D buffers 12 as a basic part of most instruction sequences. It is usually loaded from the ALU output 10C via the E bus when an address is generated by adding WP+2S, for example, which is usually done for most instructions.

The Data Register:

The D register or data register contains sixteen bits constructed as shown in detail in FIG. 5b. This register stage consists of a pair of inverters Da and Db with a feedback path via transistor Dc clocked on H2. The input of this register is from the E bus via transistor Dd and a line E (one of sixteen lines ED), with the transistor Dd being controlled by an H4DfE (D from E) command on one of the lines 41. One of the outputs is from an intermediate node De and a transistor Df which connects to the DI bus by a transistor Dg and one of the sixteen lines DDI. This output is controlled by an H1DtDI (D to DI) command on a control line 41 which is connected to the gates of all sixteen of the transistors Dg. The other output from the D register is by sixteen lines DS, each going to he gate of a transistor Sa in the swap circuit S. The output of this transistor inverter is connected to the swap bus Sb by a transistor Sc having a "straight" command on its gate or a transistor Sd having a "swap" command on its gate. The line 41 connected to the gates of each of the sixteen transistors Sc carries the H2DtSS (D to swap-straight) command, while the line 41 carrying the H2DtSW (D to S, swapped) is connected to the gates of the transistors Sd. E bus is precharged to Vcc via Dh and Dd.

The D register most often functions to receive the data output from the ALU 40 via the E bus. Also, it functions as the source of an ALU operand input to the A side via the DI bus and the A bus. The D register is used mainly for data output, and also in ready and hold conditions and in divide operations, for example.

The K Latch:

The K register or K latch contains sixteen identical stages, one of which is shown in FIG. 5b. The K register uses two standard inverters Ka and Kb with feedback on H1 by a transistor Kc. The output is connected to the gate of an inverter transistor Ke which is connected to output transistors Kf and Kg. A command Q1KtP (K to P) on one of the lines 41 turns on the transistor Kf and connects the output of the K register to the P bus via line KP. A command Q1KtDI (K to DI) turns on each of the sixteen transistors Kg and connects the output to the DI bus by sixteen lines KDI. The K register is loaded from the swap bus S in either straight or swapped condition by transistors Ki and Kj. The command H3KfSS on one of the control lines 11 connects the swap bus to the input of the K register via sixteen transistors Ki while a command H3KfSW connects the swap bus to the input of K via sixteen transistors Kj for swap or byte operations.

The Swap Circuit:

The swap circuit S shown in FIG. 5a functions to connect the 16-bit D register to, or the K register from, the A/D buffers 42 via lines 43, either straight or with the high and low bytes swapped. Addresses are usually transferred in or out via the P bus that is connected to the A/D buffers without going through the swap bus, since addresses need not be swapped in byte operations, only data. Thus, data comes in via the K register and goes out via the D register, both using the swap bus S.

The Temporary Register:

In FIG. 5d one stage of the sixteen stages of the T register or temporary register is seen in detail. This register consists of two standard inverter stages Ta and Tb with feedback on H2 via transistors Tc. Output from the T register is from a node Td at the output of the inverters, via an inverting transistor Te to a node Tf precharged to Vcc on Q3 via transistor Tg. A H1NLDI command on one of the lines 11 controls a transistor Th in series with transistors Te. Output from the node Tf directly to the B bus is by a line TB and a transistor Ti controlled by a H1TtB (T to B) command on a horizontal line 41. To shift left, the node Tf is connected by a transistor Tj to the B bus in the next more significant bit, to the left, via line TLB. To shift right, the node Tf is connected by a transistor Tk to the B bus in the next lower significant bit, to the right, via line TRB. The transistors Tj and Tk are controlled by commands H1TSLB and H1TSRB on two of the horizontal lines 41. The T register is loaded from the B bus by a line BT and a transistor Tm clocked on Q3 along with an inverter Tn and a transistor Tp which has H1TfB on its gate. This input is delayed by ¾ of a clock cycle. The transistor Tp at the inverter output has its output to the input node Tq to load the T register. The transistor Tr at the inverter output and a transistor Ts with H1TfB on its gate goes to node Tf as a path for replacing the B bus information on the B bus after a delay. Thus, H1TfB followed by H1TtB is a quicker path than loading T register then reading it out onto the B bus in the next cycle. The "F" output from the ALU 10 is connected to the input Tq through a transistor Tt, and to the gate of a transistor Tu. The transistor Tu is in series with a transistor Tv, and both Tu and Tv are controlled by H1TfF. The output of the transistor Tv goes to the node Tf as an output from F to the B bus, which may be either straight, left-shifted, or right-shifed.

The MQ Shift Register:

The MQ register consists of sixteen bits, one of which is shown in FIG. 5f. This register may be shifted left or right by controls 41 and so is used in multiply and divide instructions. Also, the register can be used as a general purpose working register. To this end, an input node MQa may be loaded from the E bus via transistor MQb and line EMQ by control H4MQfE, or loaded from the Di bus via transistor MQc and line DIMQ by control H1MQfDI. Feedback on Qe is provided by a transistor MQd, and the output of the first stage is connected to the input of the second during H2 by a transistor MQe. The left shift function is provided by a transistor MQf connecting the input node MQa to a node MQg in the next lesser significant bit of the register, this occurring when a command HD4MQSL appears on one of the lines 41. The HD4 prefix for this control means that it occurs at H4 in the next state time, or delayed one clock cycle, from the time this microcode is generated in the control ROM 45. The right shift function is produced when an HD4MQSR control occurs on a line 41 turning on a transistor MQh to connect the node MQa to the input node MQa of the next more significant bit of the register. The contents of the MQ register are applied to the E, P or B busses by a circuit consisting of an inverter MQi and inverter transistor MQj connecting input node MQa (twice inverted) to output node MQk. The output node MQk is connected by transistors MQm to the B, P and E busses when H1MQtB, H1MQtP or MD1MQtE commands occur. The output MQn of the first inverter MQp is connected to the input of the second stage by a transistor MQq on H4MQfE, when MQb is activated.

The Status Register:

One bit of the sixteen bit status register ST is shown in FIG. 5g. This stage consists of a pair of inverters STa and STb, with feedback on Q4 by a transistor STc. An input node STd may be loaded from the E bus through a transistor STe when a command H1STfE occurs. Several other input transistors STf may set or load the input node from other sources, such as other controls 41 from the control ROM 45, etc. The output of the status register is taken at an intermediate node STg by an inverting transistor STh with a transfer transistor STi going to the E bus, under control of an HD1STtE command on a line 41.

Among the controls 41 from the CROM 45 are twelve control status signals CS1 to C12 and two set status signals SS0 and SS2. These control various transistors STf to set or conditionally set the status bits according to the instruction set of Table A and the status bit definitions.

The Instruction Register:

The instruction register IR is a sixteen bit register, one bit of which is shown in FIG. 5g, containing two inverter stages IRa and IRb with feed back via transistor IRc on H2. The instruction register is loaded from the DI bus at input node IRd through transistor IRc on an H4IRLD command. Also, the instruction register may be cleared by a transistor IRf connecting the input node IRd to Vcc on an H1IRCLR command. True and complement outputs from the instruction register IR are taken at nodes IRg and IRh; these outputs go to the group detect 50 as the IR0-IR15 (and IR0-IR15) signals, and are of course used to generate entry point addresses, etc. Coming in, bits which define the addresses of registers in the workspace are fed directly to the A inputs of the ALU for source and destination address generation, under control of commands 41 before reaching IR.

Certain ones of the IR outputs and ST outputs are used in a jump detect circuit 56 (FIG. 3) to detect any of the jump instructions and/or conditions as defined by the instruction set of Table A. The bits received by the jump detect circuit are: ST0-ST3, ST5, ST0-ST4, IR-4-IR7, and IR4-IR7.

The group detect 50 receives all fifteen IR bits and complements and determines which of the eleven groups the instruction word falls in. This is based on the position of the leading "1". Then, the following four bit (or in some cases three bit or two bit) field of the instruction is used to generate the entry point address in a PLA.

The Compressed Control ROM:

The microcode control signals on the lines 41 which define the operation of the CPU are generated in a control ROM 45 as seen in FIG. 6. According to U.S. Pat. No. 4,402,043, the control ROM is compressed so that it uses much less space on the chip, and is wideword format so control bits are easily added, such as those used for the test modes. The control ROM 45 generates a different set of microcontrol signals on the lines 41 for each individual address applied to the eight input address lines 46; the address input is split into a four-bit X address on lines 46a and a four-bit Y address on the lines 46b. For each of the 256 possible address inputs, a unique combination of outputs could be produced, but in a typical embodiment less than 256 are required because an instruction set can be implemented with fewer than 256 states. In a CPU which executes the instruction set of Table A, for example, about 150 address or microcode states are used to selectively activate about 120 to 130 controls 41 (including eight microjump addresses for lines 47).

The control ROM 45 is split into an X-select portion 45x and a Y-select portion 45Y. The X-select portion contains sixteen X lines 45a and a variable number of Y lines, depending upon the degree of compression. The X address on the lines 46a selects one-of-sixteen of the lines using a standard decoder.

Microcode States for Register-to-Register Add Operation

Figure 2D:
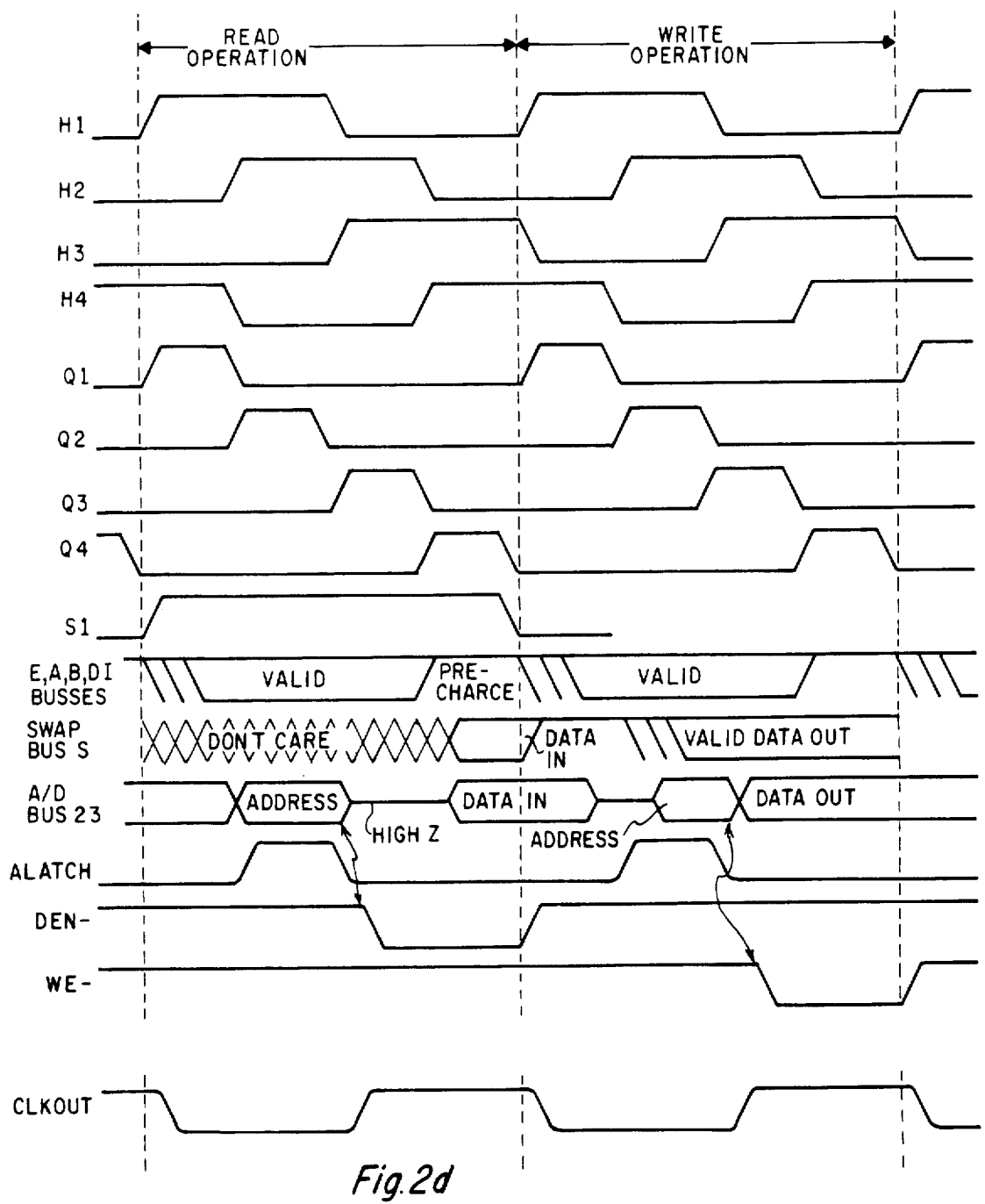
FIG. 2d is a timing diagram showing voltage vs. time for operations in the local CPU of the microprocessor device 20 of FIG. 2.

One of the most common instructions in any processor is "add". In the CPU described herein, the add instruction uses workspace addressing. The two operands are obtained from registers in the local RAM 22 via bus 23 and the result is stored in a register in the local RAM 22. Various addressing modes may be used, including direct, indirect, automatic incrementing, indexed, immediate or relative, as explained in U.S. Pat. No. 4,402,044. The example uses register direct addressing for one operand located in the workspace, and register indirect addressing for the other operand which is in a register whose address is located in the workspace; the result is restored in the same register which is directly accessed for an operand. This instruction is referred to as "ADD *R, R" in assembly language for programming purposes. Execution of the add instruction of the example uses parts of seven "state" times or clock cycles. A different set of microcode controls is produced by the control ROM during each microcode state time. The timing sequence of clocks used in the CPU 21 is shown in FIG. 2d and includes four overlapping half-cycle clocks H1, H2, H3 and H4. The clock H4 of course occupies part of the state time after the one in question. Also, a state time contains four quarter cycle clocks Q1, Q2, Q3 and Q4. The device is built using N-channel technology, so the clocks are positive-going. Typically, the state time is 200 nsec., or the repetition rate is 5 MHZ. The clock input 0 to the chips or the crystal frequency is four times the state frequency or about 20 MHZ.

The local RAM 22 can be accessed within a state time of the CPU 21, so when an address is sent out on the bus 23 during Q2 of a given state time the contents of the addressed location will appear on the bus 23 for input to the CPU 21 during Q4 or H4 in the same state time. The add instruction of the example requires five memory access operations: one to fetch the instruction, one to fetch the address of the "source" operand, two for the "source" and "destination" operands, and one to store the result in the local RAM 22 at the "destination" location.

The instruction for the add operation of this example is fetched before the previous instruction has completed execution. This pre-fetch increases operating speed. It will be assumed that the prior instruction also used an ALU cycle and a destination write, like an add operation, and that the next instruction following the one of the example is also similar to the add operation, to illustrate the pre-fetch and overlap of operations. Of the seven microcode state times partially occupied by the add operation of this example, the first two are shared with the prior instruction and the last two are shared with the following instruction execution; thus only the central three are exclusively used by this add operation.

Referring now to FIG. 7 a chart of microcode states for execution of the ADD *R, R instruction is illustrated. The seven state times to be discussed are designated S1 through S7. Briefly, during S1 (which overlaps the prior add instruction) the instruction word in question is pre-fetched by sending out the address which is in the P register onto the bus 23 to access a location in the memory space (ordinarily the ROM 27 which contains program rather than the RAM 22 which is used for workspaces and data); then the contents of this location are received back on the bus 23 and loaded into the instruction register IR. During S2, the result of the prior operation is written into the location in the memory 22 which is in the memory address register MA; the contents of MA register are sent out on the bus 23 followed by the result of the previous add operation. Meanwhile, during S2, the contents of the WP register are added in the ALU 40 to a number derived from the instruction word pre-fetched during S1; this number is two times the source register number, or 2S. So, the address of the source register is calculated during S2 and is stored in the MA register, then during S3 this address is sent out on the bus 23 to access the source address contained in the selected register of the workspace; this source address is read from the local RAM 22 and returns via bus 23 to be stored in MA and K registers in CPU 21. During S4 state time the address of the source operand is sent out from the K register onto bus 23 and the contents at this address in memory 22 returned via bus 23 to the K register.

Also during S4 the destination address is calculated in ALU 40 by adding the contents of the WP register to two times the "D" field of the instruction word and storing the result in the MA register. Next, during S5, this calculated D address (within the workspace, thus "direct") is sent out from MA register on bus 23 while the operand in the K register is moved to the T register. Then, the contents of the addressed register in memory 22 is returned via bus 23 to be stored in the K register of the CPU 21, still during S5. Now the add operation is ready to be implemented; the S operand is in the T register and the D operand is in the K register. Thus, during state S6 the add operation is executed by adding the contents of K and T and putting the result in the D register. Meanwhile, however, during S6 the instruction for the next operation is pre-fetched by sending out the address in the program counter PC (which has been incremented) onto local bus 23 and receiving the contents of this address from ROM 27 back via bus 23 to be loaded during S7 in the instruction register IR in CPU 21. Also, during S7 state time, the result of this example add operation is written into memory 22 by first sending out the address in the MA register (which is the D or destination address calculated during S4) onto bus 23, followed by the contents of the D register, completing execution of the ADD *R, R instruction. During S7, incidentially, the source address for the next instruction is calculated in the ALU 40 by adding the contents of the workspace pointer WP to two times the S field of the instruction word accessed in S6, so another add operation is already two state times into its execution sequence. Accordingly, the states S6 and S7 correspond to the states S1 and S2 of FIG. 7.

The instruction word for "ADD R*, R" is shown in FIG. 7a. This is the sixteen bit word which is read during S1 state time in FIG. 7, i.e., the contents of the location addressed by the PC register, in this example. The first 3-bit field 010 says "add". The "B" field, bit 3, defines whether this is a byte operation or a work operation; in this example it is a word operation. If B=1, the operands are bytes and the operand addresses are byte addresses. With B=0, the operands are words. The TD and TS fields, bits 4, 5 and 10, 11, determine the addressing mode of that operand. In the example, TS is 00 so the S field (bits 12-15) contains the register number in the workspace which has the source operand. TD is 01, meaning indirect workspace register addressing mode, so the D field (bits 6-9) contains the register number in the workspace which has the address of the destination operand in it.

Considering the execution of the ADD *R, R instruction example in more detail, it will be noted that FIG. 7 also shows the contents of the various registers and busses as a function of time, as well as other features. Each of the register and bus operations will be examined for each microcode state time, along with the control signals produced on the lines 41 to produce these operations.

IN the S1 state time of FIG. 7, the control line 41 for H1PCtP (see FIG. 5c) is high during H1, turning on transistors PCi and placing the contents of the PC register on P bus. Then the DEN command goes high on H1, so the P bus is loaded into the output bufferes 42 and thus to the bus 23. The program counter PC is incremented during H3 time by the H3PCINC command on a line 41, turning on transistors PCj and PCm of FIG. 5c, so later at S6 the next instruction in sequence will be accessed. A DEN signal comes up on H2 on a control line 41 to produce a DEN-command at H3 on one of the lines 24 to enable the memory 22 to put data on the bus 23 beginning at Q4. The instruction word fetched here is valid on the bus 23 beginning at Q4, and is loaded into the K register via lines SK by a control H3 KfSS generated every H3 except when blanked; this control turns on the sixteen transistors Ki of FIG. 5b. During this state time S1 an add operation for the prior instruction occurs just as will be described for S6, directing the result to the E bus. A control SAMPI on one of the lines 41 causes the interrupt input to be sampled so that if an interrupt is present a context switch will occur.

Turning now to the S2 state time of FIG. 7, the instruction which is in the K register is connected to the DI bus at Q1 when the Q1KtDI command goes high and turns on the sixteen transistors Kg; this command occurs every Q1 unless blanked by a control line 41. A command 2StA at H1 causes the S field of the instruction word on the DI bus to be left-shifted and connected by four transistors Ca to bit-11 through bit-14 of the A bus as seen in FIG. 5e. The contents of the workspace pointer register WP are transferred to the B bus at H1 by the H1WPtB command on a line 41 turning on the transistors WPf of FIG. 5c. Thus, with WP on the B bus and 2S on the A bus, when the ALU 40 operates (at H2 and H3) an output will be produced at node 10C during H3 which is the sum (WP+2S). A command ALtE on a line 41 occurs at delayed H1 time, meaning delayed one state time, so at H1 of the next cycle the ALU output is connected by transistors 10a to the E bus. As will be described below with reference to the S7 state, the result of the previous operation is written into memory 22 from D register which was loaded from the E bus at H4; the ALU 40 loaded the E bus at S2, H1 (the same as HD1 for S1).

During the S3 state time of FIG. 7, the address of the register which will contain the source address is generated by an ALU operation. In this operation the contents of the workspace pointer register WP are applied to the B bus by H1WPtB command turning on transistors WPf and an IR2D command at H1 which applies bit-6 through bit-9 of the instruction register IR to bit-11 through bit-14 of the DI bus via the transistors IRe' of FIG. 5g. The IR2D command in effect left shifts the D field of the instruction word (see FIG. 7a) by one bit to multiply by binary two, then applies it to the A input of the adder via the DI bus. The ALU 40 is in the add condition by default, none of the ALU1-ALU4 commands being present, and the input 10c is applied to the E bus at H1 of the next state time by the HD1ALtE command on the line 41 to the gates of transistors 10a (FIG. 5d).

Testing of CPU

As thus far described, the normal operation of the CPU 21 in executing the instruction set of Table A has been illustrated. For testing the chip containing the CPU 21, however, it is necessary to add some further capabilities. It is too time consuming, and not totally conclusive, to test a one-chip CPU device by executing all of the instructions, because some faults are data-dependent. Also, stuck-faults, i.e. internal nodes stuck at logic-1 or logic-0, may cause an erroneous result only under conditions occurring rarely. So, as in testing a dynamic memory device, all of the data bits in the registers of the CPU, and nodes in the ALU, must be tested for various patterns of data and controls.

This testing is accomplished in the CPU 21 by employing additional microcode in the control ROM 45 which has no function other than test, and which is not used in the execution of the standard instruction set of Table A. This test microcode may use unique control lines 41, and microstates, and also will use sets of signals 41 like many existing microcode states for the standard instruction set, but different microjump addresses will be needed because the sequences will always be different from the standard sequences like FIG. 7.

Figure 8:
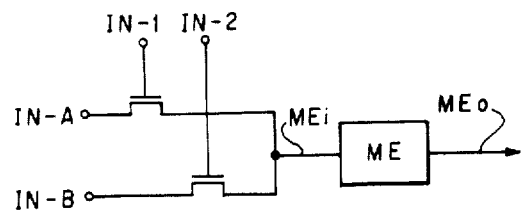
FIG. 8 is a schematic diagram of an example of a circuit within FIGS. 3 or 5a–5g to be tested by microcode.

Each of the register bits of the registers in the CPU may be thought of as a memory element ME of FIG. 8, with an input MEi and an output MEo. The input MEi can receive a data bit from two sources, IN-A or IN-B, and these input paths are controlled by the control nodes IN-1 and IN-2 which connect to gates of transistors. The output MEo may also be connected to more than one output bus, as seen for the MQ register which can go to P bus or B bus, or the K latch to the P bus or DI bus. However, for simplicity in explanation of the fault-flushing concept, only the inputs will be treated. For example, the general form of FIG. 8 corresponds to the two inputs MAfDI and MAfE via transistors MAe and MAd to one bit of the MA register of FIG. 5c, where bits of the DI bus and E bus would correspond to the sources IN-A and IN-B.

A truth table for the circuit of FIG. 8 is shown in Table D. The patterns T to Z are various combinations of inputs data bits IN-A and IN-B with controls IN-1 and IN-2, showing the memory output MEo for the initialization cycle I(T) and for the test cycle M(T+1) for a good circuit and for a faulted circuit. Each of the fault possibilities are shown for each input; these are stuck-at-one S@1 and stuck-at-zero S@0. Note that all of these patterns are needed to find all of the possible faults. Pattern-T finds stuck-at-one for either control, IN-1 S@1 or IN-2 S@1. Pattern-U and pattern-W find stuck-at-zero for the control bits, IN-1 and IN-2. Pattern-X and pattern-Z find stuck-at-one for the data bits IN-A and IN-B. Pattern-V and Pattern-Y finds stuck-at-zero for the data bits, IN-A and IN-B.

To implement the test of Table D in the registers of the CPU 21, algorithms are written in microcode, for each register. For example, in the first state the memory element (actually all sixteen bits of a register at once) is initialized by providing a condition of all input data high; this is done by inputting FFFF via the bus 23 with DEN active, and selecting microcode which places this data on the two busses or sources for the selected register, e.g. K register and E bus for MA register, or DI bus and E bus for MQ register bits. The controls for the two inputs are held high at this point, e.g. by KtMA and EtMA microcode bits 41, or DItMQ and EtMQ microcode bits 41. The memory contents are verified to be high by either (1) outputting this register via P bus and bus 23 for external check by the test machine, or by an ALU operation and jump or interrupt on status depending upon the results. This completes the initialization cycle I(T). Next the pattern-T is produced; all controls are held off by the appropriate microcode bits 41, and the input data (the busses, etc.) are held low by microcode controls or data input of zeros. The memory content is checked at this point, as before, and the result interpreted as in Table D, detecting if either control is stuck-at-one. This sequence can be repeated for each of the registers, and indeed for the A,B, DI or P busses themselves. The difference from ordinary operation is that two inputs are simultaneously trying to drive a node in the test microcode, whereas this would not be used in executing the standard instruction set, and indeed would be highly undesirable. However, this condition is needed for stuck fault detection. Errors would certainly turn up in ordinary operation if stuck faults existed, but these would be data-dependent and may require exhaustive and time-consuming patterns on the test machine.

For the other patterns U,V,W,X,Y,Z, tests are made by first initializing as described above, and verifying that all memory bits are high. Then the selected pattern is produced by inputting data to the two selected inputs for the selected register according to the values given in the truth table, and also defining the two controls according to the truth table, and verifying that the memory is low or high as set forth. This is iterated until all possible combinations are checked. Generally all bits at an input are one or zero, at a given time. Doing this same sequence for all registers of the CPU increases the number of iterations in the loop at this point, but does not add to the number of microcode states since merely the input data is changed. These patterns check for controls stuck-on-zero, or data bits stuck-on-one, or data bits stuck-on-zero.

One additional test of the CPU 21 is a check of the outputs 41 from the control ROM 45. For this test a shift register SR is included on the chip at the control ROM output, and this shift register is loaded in parallel by the control ROM 45 output by a particular microcode bit #LDCR. In standard operation the outputs 41 are not loaded into SR, but for this test the #LDSR bit occurs and all 130 (or whatever number) bits are loaded into SR in one cycle, then for the next 130 cycles the bits are clocked out serially on one of the output pins, such as an address/data I/O pin of the bus 23. If there are 256 possible addresses for the control ROM 45, then this entire sequence must be repeated 256 times. Addresses for the control ROM are applied to lines 46 from a counter TC, which is an eight-bit shift counter, for example, zeroed at reset and incremented every time the microcode bit #LDSR is produced. Thus, a selected code input on the four test pins (TEST-, TEST0, TEST1 and TEST2) as defined in Table E causes the test control circuit to produce the control #LDSR which increments the counter TC, applies the counter output to the address bus 46, producing a set of microcode outputs 41 from the control ROM 45, which is loaded into the shit register SR (rather than executed in the CPU); then during the next 130 or so clock cycles this microcode word is shifted out serially one bit at a time, to be compared with the known value in an external test machine.

On-Chip Timer

Figure 9:
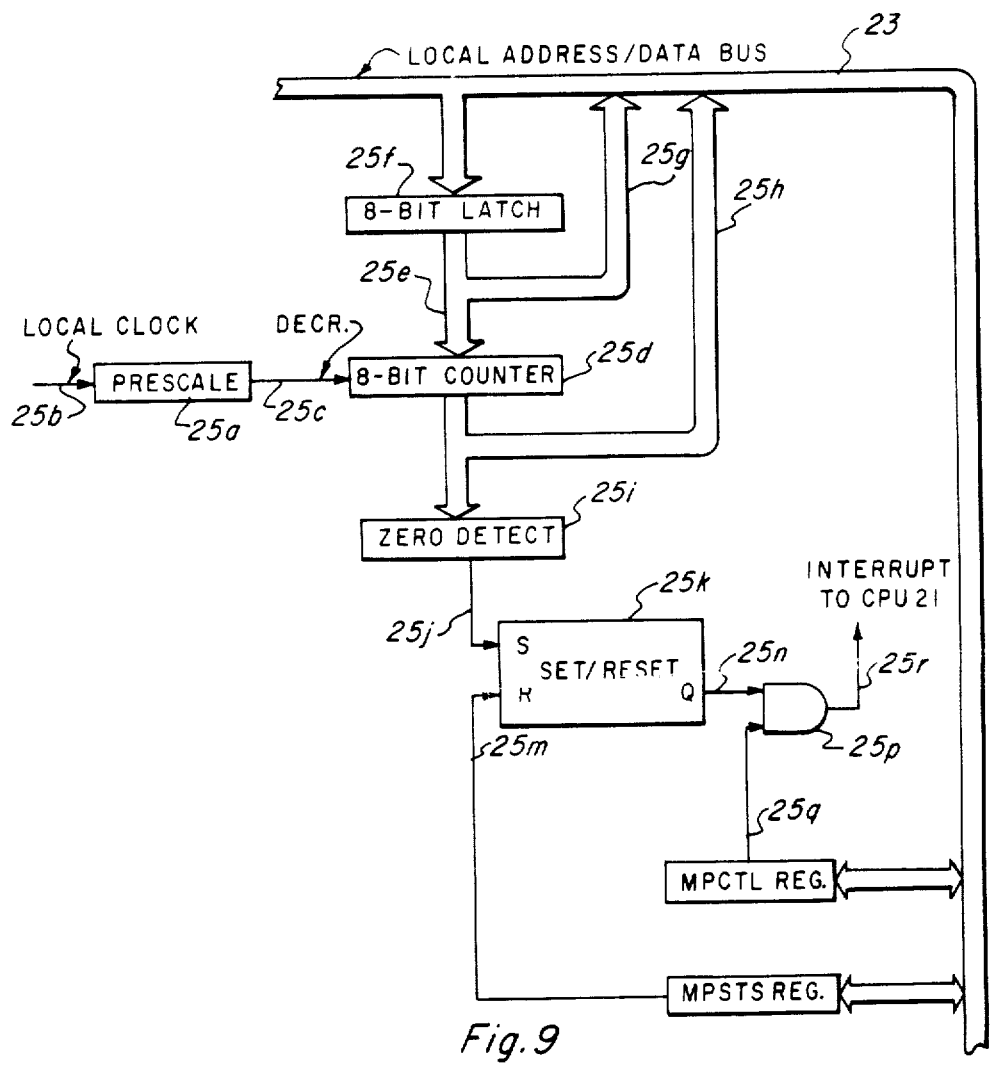
FIG. 9 is a schematic diagram of the timer circuit.

Referring to FIG. 9, the timer 25 is shown in block diagram form. The timer includes a fixed 512-bit prescale counter 25a which receives the local clock at its input 25b and produces a decrement signal at its output 25c. The prescale counter 25a may be constructed as a pseudorandom shift counter with exclusive-OR feedback, as is well known. The output 25c is produced about every 170 microsec, and goes to a timer data register 25d which may be loaded with any 8-bit value by an input 25e from a timer latch 25f. The latch 25f may be loaded from the local bus 23, and it appears in the memory space accessed by the local bus. The latch 25f can also be read by the CPU 21 via the local bus 23 through path 25g. In like manner, the contents of the timer data register 25d can be read by the local CPU 21 via the local bus 23 through path 25h, as this register also appears in the memory space accessed by the local bus. Every time the prescaler 25a decrements to zero and produces an output 25c, the register 25d is decremented, so when a count of the value loaded into this register 25d from the latch 25f and local bus has been reached, the register 25d will reach through an all-zero condition. This condition is detected by a zero-detector circuit 25i, which is a NOR gate arrangement of conventional form. An output 25j from the zero-detector circuit is connected to the set input of a set-reset flip-flop 25k, which receives its rest input 25m from a certain bit of the MPSTS control register. If the flip-flop 25k has been reset, then when it is set by input 25j it produces an output 25n which is used to indicate a timer interrupt to the CPU 21. An AND gate 25p receives this interrupt signal as one input, and receives a bit from the MPCTL register on input 25q which determines enable or disenable of the timer interrupt. A "timer interrupt active" signal is thus produced on the line 25r going to the CPU 21, if all conditions are met.

The GPTIEN bit in the MPCTL register and on line 25q is set or reset by the CPU 21 by writing a word to MPCTL. When set, this GPTIEN (general purpose timer interrupt enable) bit enables a interrupt (priority level ten) when and if the GPTINT (general purpose timer interrupt) bit is also set in the MPSTS register on line 25m. If GPTIEN is zero, then GPTINT may be set, but no interrupt is generated. The GPTINT bit is set on the local bus cycle following the decrement pulse of register 25d from a count of one to a count of all zeros. This bit is automatically set by the circuitry, and is reset by the CPU 21 under its program control. It is set when the timer decrements past zero, then is cleared when the CPU 21 writes a word to MPSTS register containing a zero in this bit position. Thus, after an interrupt from the timer, the CPU 21 will not accept another such interrupt unless its program causes this reset.

The counter data register 25d is loaded with the contents of the latch 25f via input 25e when either of the following ocurrs: the GPTSTART bit of the MPCTL register is toggled froom 0 to 1 by writing a word to MPCTL by the CPU 21; or the register 25d decrements to zero.

The decrement of register 25d starts when the CPU 21 writes a one to the timer start bit of MPCTL and the previous value of this bit was zero. The local clock at 25b, nominally 3-MHz, is divided by 512 by prescaler 25a and forms a decrement pulse on input 25c of the register 25d. When register 25d decrements to zero, the GPTINT bit 25j is set, and if GPTIEN is set at input 25q, an interrupt is asserted to CPU 21 in line 25r.

On the local bus cycle following the one which decremented register 25d to zero, the register 25d is immediately reloaded with the value in latch 25f. Hence, the period of the general purpose timer interrupts is 512× (cycle time)×(latch 25f value). In a typical situation, this interrupt should be about ten millisec., i.e. about every thirty thousand machine cycles for the CPU 21. Using registers in RAM 22, the CPU 21 generates a number of different timeouts under its program control, based on this hardware timeout. For example, if no free token or starting delimiter appears on the ring 11 for a given time, then it is assumed that a fault condition has occured, and fault detector or corrector signals are sent.

Bus Arbitration

The bus arbiter 26 in the chip 20 is provided to allow the protocol handler chip 16, the system interface chip 30, or another external DMA device to arbitrate for control of the local bus 23. Immediately following system reset by SRESET-, the CPU 21 of chip 20 has control of the bus 23, but the chip 16 and the chip 30 can request and gain control of the bus 23 to perform DMA transfers. Following completion of the DMA cycle or cycles, bus control is returned to the chip 20. In order to maintain maximum utilization of the bandwidth of the local bus 23, the request and grant sequences for future bus cycles are overlapped with the bus cycle currently in progress.

Arbitration and control of the local bus 23 of the arbiter 26 is coordinated by a bus-request/bus-grant handshake using the LBRQ1-, LBGR1, and LBRQ2, LBGR2- handshake pairs on the chip 20, as illustrated in FIGS. Xa and Xb. The LBRQ1- input from the chip 16 has priority over the LBRQ2- input from the system interface chip 30.

The external bus master (chip 16 or chip 30) asserts LBRQ1- or LBRQ2- to request the bus, and the arbiter 26 responds to the bus request by asserting LBGR1- or LBGR2-, then floating the address/data, LEN-, LAL, LI/D-, LR/W- lines from the chip 20 at the completion of the bus cycle.

In order of priority, the masters of the local bus 23, as determined by the arbiter 26, are:
(1) External master on LBRQ1-, the protocol handler chip 16;
(2) External master on LBRQ2-, the system interface chip 30;
(3) Internal master from the CPU 21 for microprocessor instruction and data access.

Within the system interface chip 30, the memory-mapped I/O bus controller has priority over the system DMA bus controller.

It is possible that a higher priority bus master may request the local bus 23 while one of the external bus masters has control. That is, the protocol handler chip 16 may request the bus 23 while the system interface chip 30 has control. This could occur when an incoming message is detected at a time when an outgoing message frame is being copied from memory 32 to memory 22 by DMA. In this case, the following occurs:
(1) the bus arbiter 26 deasserts LBGR2- in Q3 of the current bus cycle;
(2) the system interface chip 30 completes the current cycle (possibly with wait states), and tristates its bus signals, leaving LBRQ2- asserted during this time;

(3) LBGR1- is asserted;

(4) when the higher priority master, chip 16, has accomplished its DMA task, such as copying an incoming message frame into the RAM 22, it deasserts LBRQ1-, and the bus arbiter 26 then reasserts LBGR2-;

(5) the system interface chip 30 then reassumes control of the bus 23, and completes copying the outgoing data frame.

System Interface Chip

Referring to FIG. 2, the system interface chip 30 implements two complete bus interfaces, one to the system data bus 34 (and its control bus 35), and the other to the local address/data bus 23. The input and output pins of the chip 30 are described in Table F. Of course, some of the pins are the same as in Table E since some go to the chip 20.

The chip 30 contains two separate controllers. First, a memory-mapped I/O controller with the MMIO register which manages the references by the host system 12 (the host CPU 31) to the memory-mapped registers presented by the adapter 10. The second is a DMA controller which performs DMA transfers between the host system bus 34 and the adapter's local bus 23. With these mechanisms, a variety of different logical interfaces between the host system 12 and the adapter 10 may be implemented with the code executed in local CPU 21 (code stored in ROM 27). The terms memory-mapped I/O and system DMA refer to the data transfer mechanisms as seen from the host system 12 side. This is different from registers in the memory space of local bus 23 on the local side of the chip 30.

For memory-mapped I/O, the adapter 10 appears to the host system 12 as a set of eight consecutive byte addresses. Two registers are dedicated to bit-level status and control information; the program code in ROM 27 executed by the CPU 21 defines the meaning of these bits. The memory-mapped I/O unit 61 also maintains an address register into the local data space of the adapter 10, and the host system 12 may indirectly access any RAM 22 or ROM 27 byte in the memory on the local bus. During system 12 or CPU 31 reads or writes to local memory 22 or the local data space, the CPU 21 is locked out of the local RAM 22. With this approach, command and status task blocks may be written by the host CPU 31 and asynchronously examined by the CPU 21. The memory-mapped I/O unit also places a programmable interrupt vector on the system bus 34 during system bus interrupt acknowledge cycles.

The system interface chip 30 also allows for the local CPU 21 to initiate direct memory access between the on-chip RAM 22 and the system memory 32, for incoming frame data or command/status interchange. This DMA is completely under control of the program for CPU 21 stored in the ROM 27.

System Transmit

To transmit a message, the host system 12 first creates a data frame in its memory 32, under control of the host CPU 31. Then, the CPU 31 writes to the MMIO register of system interface chip 30, which causes an interrupt of the CPU 21, and indicates in the MMIO register the starting address on the system bus 34 of the data frame.

The CPU 21 then sets up a system DMA for system-to-local transfer. This is accomplished by executing program code from the ROM 27 starting at the vector address used for the interrupt. The CPU 21 sets up the following registers: LDMA ADR to contain the system bus 34 address for the data frame; SDMA ADR to contain the local RAM 22 address via local address-/data bus 23 for the frame; a SDMA CTL control bit is set to start; SDMA LEN gives the length of the frame. A system DMA through the chip 30 then transfers the data frame from the system RAM memory 32 to the local RAM 22, using a FIFO in the chip 30 so that transfers of data words from the bus 34 to the FIFO are under control of the system control 64 in the chip 30 and synched to the system clock SBCLK, while transfers from the FIFO to the local RAM 22 via bus 23 are under control of the DMA controller in the chip 30 and synched to the local bus clock LBCLK. A cycle on the system control side, if the FIFO is not full, is as follows: the system side controller requests the system bus 34; the host system 12 sends a bus grant to the chip 30; a word (or byte) of data is sent from the system memory 32 into the FIFO; SDMA LEN register is decremented. These cycles continue until the SDMA LEN register is zero, or until the SBERR system bus error pin is asserted, or the DMAHALT bit of the SIFCTL register is set. A cycle on the local control side, if there is data in the FIFO, is: the local side controller requests the local bus 23 by a LBRQ1- signal; the LBGR1 is asserted by the chip 20; one word of data is written into the local RAM 22 from the FIFO.

When the entire frame has been copied from the RAM 32 to the RAM 22 in this manner, the system interface chip 30 again interrupts the CPU 21 to indicate that the DMA is complete. The CPU 21 can then operate on the data in local RAM 22 for checking, reformatting, encrypting, etc. When ready to transmit, the CPU 21 sets up the chip 16 for transmit by writing the local starting address and length of the data frame into two registers of the chip 16. The control of transmit now switches to the chip 16. First the transmit FIFO 37 is filled by DMA from chip 16 into RAM 22 of chip 20, using LBRQ2- and LBGR2- controls. The chip 16 then waits for a free token on the input 13 and 13' from the signal line 11. When a free token comes in, the chip 16 changes it to a busy token (sets bit to one), and starts sending data from the FIFO 37 through seriallizing register 38 and multiplexer 39 to the output 14' and 14. Whenever the FIFO 37 is not full, the chip 16 asserts a request for the local bus by line LBRQ2- and when it gets a LBGR2- from the bus arbiter 26 of the chip 20, a word of data is read from the local RAM 22 to the FIFO 37; the length register is decremented for each word transmitted; this continues until the length register is zero.

The data rate on the ring 11 may be about four M-bit per second or 0.5 M-byte per second, in a typical example. The transfer rate from the local RAM 22 to the FIFO 37 is at a maximum rate defined by the local bus clock or the cycle time of the CPU 21, which is about 333 nsec, for example, meaning 16-bits are transferred every 333 nsec, which is six M-bytes per sec. Thus, the FIFO 37 can be kept filled furing this transfer using only about 0.5/6 or one-twelfth of the cycles of the CPU 21. So the CPU 21 can be doing other operations, merely loosing a cycle now and then for the data transfer to the chip 16 for transmit. Likewise, the host system 12 typically has a system clock of 8-MHz, providing a data transfer rate on the system bus 34 of two M-byte per sec, which is four times that on the signal line 11. Thus, the DMA to transfer the frame from the system RAM 32 to the local RAM 22 is at a higher rate than the off-loading transfer from RAM 22 to the FIFO 37 in chip 16 for transmitting. Accordingly, it is possible to interleave DMA from host system 12 to local RAM 22 with DAM by chip 16 to local RAM 22, although this would not be necessary in most of the transmit operations.

TABLE A

The Instruction Set

Data Transfer Instructions

The MOV instructions are used to transfer data from one part of the memory 2 to another part, of from one location in the memory map to any other. The LOAD instructions are used to initialize registers to desired values. The STORE instructions provide for saving the status register (ST) or the workspace pointer (WP) in a specified workspace register.

Load Immediate—LI

Operation: The 16 bit data value located at the address given in the word immediately following the instruction LI is loaded into the workspace register R specified by the 4-bit field of bits 12-15 of this LI instruction.

Applications: The LI instructon is used to initialize a selected workspace register with a program constant such as a counter value or data mask.

Load Interrupt Mask Immediate—LIMI

Operation: The low order 4-bit value (bits 12-15) in the word immediately following this instruction is loaded into the interrupt mask portion of the status register (bits 12-15).

Application: The LIMI instruction is used to initialize the interrupt mask to control which system interrupts will be recognized.

Load Workspace Pointer Immediate—LWPI

Operation: The 16-bit value contained in the word immediately following the instruction is loaded into the workspace pointer WP.

Application: LWPI is used to establish the workspace memory area for a section of the program.

MOVE Word—MOV

Operation: The word in the source location specified by bits 10-15 of the instruction is transferred to the destination location specified by bits 4-9, without affecting the data stored in the source location. During the transfer, the word (source data) is compared to 0 with the result of the comparison stored in the status register.

Application: MOV is used to transfer data from one part of the system to another part.

MOVE Byte—MOVB

Operation: Like MOV except operates on bytes.

Application: MOVB is used to transfer 8-bit bytes from one byte location to another.

Swap Bytes—SWPB

Operation: The most significant byte and the least significant byte of the word at the memory location specified by bits 10-15 of the instruction are exchanged.

Application: Used to interchange bytes if needed for subsequent byte operations.

Store Status—STST

Operation: The contents of the status register ST are stored in the workspace register specified by bits 12-15 of the instruction.

Application: STST is used to save the contents of status register ST for later reference.

Store Workspace Pointer—STWP

Operation: The contents of the workspace pointer WP are stored in the workspace register specified by bits 12-15 of the instruction.

Application: STWP is used to save the contents of the workspace pointer register WP for later reference.

Arithmetic Instructions

These instructions perform the following basic arithmetic operations: addition (byte or word), subtraction (byte or word), multiplication, division, negation, and absolute value.

Add—A

Operation: The data located at the source address specified by bits 10-15 of the instruction is added to the data located at the destination address specified by bits 4-9. The resulting sum is placed in the destination location, and is compared to zero for setting status bits.

Application: Binary addition is the basic arithmetic operation required to generate many mathematical functions. It functions as "pass" when one input is zero. This instruction can be used to develop programs to do multiword addition, decimal addition, code conversion, and so on.

Add Bytes—AB

Operation: Like Add but for bytes instead of words. The source byte addressed by bits 12-15 is added to the destination byte addressed by bits 4-9 and the sum byte is placed in the destination byte location. Useful when dealing with subsystems or data that use 8-bit units, such as ASCII codes.

Add Immediate—AI

Operation: The 16-bit value contained in the word immediately following the instruction is added to the contents of the workspace register specified by bits 12-15 of the AI instruction.

Application: Used to add a constant to a workspace register. Useful for adding a constant displacement to an address contained in the workspace register.

Subtract Words—S

Operation: The 16-bit source data (location specified by bits 10-15) is subtracted from the destination data (location specified by bits 4-9) with the result placed in the destination location. The result is compared to 0.

Application: Provides 16-bit binary subtraction.

Subtract Bytes—SB

Operation: Like S except for bytes instead of words.

Increment—INC

Operation: The data located at the source address indicated by bits 10-15 of the INC instruction is incremented and the result is placed in the source location and compared to 0.

Application: INC is used to increment byte addresses and to increment byte counters.

Increment by Two—INCT

Operation: Two is added to the data at the location specified by the source address in bits 10-15 and the result is stored at the same source location and is compared to 0 to set status ST. Similar to INC.

Application: This can be used to increment word addresses, though autoincrementing on word instructions does this automatically.

Decrement—DEC

Operation: One is subtracted from the data at the location specified by bits 10-15, the result is stored at that location and is compared to 0. Similar to INC.

Application: Most often used to decrement byte counters or to work through byte addresses is descending order.

Decrement by Two—DECT

Operation: Two is subtracted from the data at the location specified by bits 10-15 and the result is stored at that location and is compared to 0. Similar to INC.

Application: This instruction is used to decrement word counters and to work through word addresses in descending order.

Negate—NEG

Operation: The data at the address specified by bits 10-15 of the instruction is replaced by its two's complement, and the result is compared to zero for setting status ST.

Application: NEG is used to form the two's complement of 16-bit numbers.

Absolute Values—ABS

Operation: The data at the address specified by bits 10-15 of the instruction is compared to zero to set status ST. Then the absolute value of this data is placed in the same location.

Application: Used to test the data in the specified location and then replace the data by its absolute value. This could be used for unsigned arithmetic algorithms such as multiplication.

Multiply—MPY

Operation: The 16-bit data at the source address designated by bits 10-15 is multiplied by the 16-bit data contained in the destination workspace register R specified by bits 6-9. The unsigned binary product (32-bits) is placed in workspace registers R and R+1.

Application: MPY can be used to perform 16-bit by 16-bit binary multiplication. Several such 32-bit sub-products can be combined in such a way to perform multiplication involving larger multipliers and multiplicands such as a 32-bit by 32-bit multiplication.

Divide—DIV

Operation: The 32-bit number contained in workspace registers R and R+1 (where R is a destination address specified at bits 6-9) is divided by the 16-bit divisor contained at the source address specified by bits 10-15. The workspace register R then contains the quotient and workspace R+1 contains the 16-bit remainder. The division will occur only if the devisor at the source address is greater than the data contained in R.

Application: DIV provides basic binary division of a 32-bit number by a 16-bit number.

Signed Multiply—MPYS

Operation: The signed two's complement integer in workspace register R0 is multiplied by the signed two's complement integer specified by the source address (bits 10-15). The result is a signed 32-bit product which is placed in workspace register R0 (for the 16 MSB's) and workspace register R1 (the 16 LSB's). The result is compared to zero.

Application: Provides signed multiplication for the system.

Signed Divide—DIVS

Operation: The signed 32-bit two's complement integer (dividend) in workspace registers 0 and 1 is divided by the signed 16-bit two's complement integer (divisor) specified by the source address (bits 10-15). The signed quotient is placed in workspace register R0 and the signed remainder is placed in workspace register R1.

Comparison Instructions

These instructions are used to test words or bytes by comparing them with a reference constant or with another word or byte. Such operations are used in certain types of division algorithms, number conversion, and in recognition of input command or limit conditions.

Compare Words—C

Operation: The two's complement 16-bit data specified by the source address at bits 10-15 is compared to the two's complement 16-bit data specified by the destination at bits 4-9, and appropriate status ST bits are set based upon the results. The contents of both locations remain unchanged.

Application: The need to compare two words occurs in such system functions as division, number conversion, and pattern recognition.

Compare Bytes—CB

Operation: The two's complement 8-bit byte at the source address (bits 10-15) is compared to the two's complement 8-bit byte at the destination address (bits 4-9). and status ST is set.

Compare Immediate—CI

Operation: CI compares the contents of the specified workspace register R (defined by bits 12-15) to the value contained in the word immediately following the instruction, and sets status bits accordingly.

Application: CI is used to test data to see if system or program limits have been met or exceeded or to recognize command words.

Compare Ones Corresponding—COC

Operation: The data in the source location addressed by bits 10-15 acts as a mask for the bits to be tested in workspace register R specified by bits 6-9. That is, only the bit position that contain ones in the source data will be checked in R. Then, if R contains ones in all the bit positions selected by the source data, the equal (EQ) status bit will be set to 1.

Application: COC is used to selectively test groups of bits to check the status of certain sub-systems or to examine certain aspects of data words.

Compare Zeroes Corresponding—CZC

Operation: The data located in the source address specified by bits 10-15 act as a mask for the bits to be tested in the workspace register R specified by bits 6-9. That is, only the bit positions that contain ones in the source data are the bit positions to be checked in R. Then if R contains zeroes in all the selected bit positions, the equal (EQ) status bit will be set to 1.

Application: Similar to the COC instruction.

Logic Instructions

The Logic instructions allow the processor to perform boolean logic for the system. Since AND, OR, INVERT, and Exclusive OR (XOR) are available, any boolean functions can be performed on system data.

AND Immediate—ANDI

Operation: The bits of the workspace register specified by bits 12-15 are logically ANDed with the corresponding bits of the 16-bit binary constant value contained in the word immediately following the instruction. The 16-bit result is compared to zero and is placed in the register R.

Application: ANDI is used to zero all bits that are not of interest and leave the selected bits (those with ones in value) unchanged. This can be used to test single bits or isolate portions of the word, such as a four-bit group.

OR Immediate—ORI

Operation: The bits of the specified workspace register R are ORed with the corresponding bits of the 16-bit binary constant contained in the word immediately following instruction. The 16-bit result is placed in R and is compared to zero.

Application: Used to implement the OR logic in the system.

Exclusive OR—XOR

Operation: The exclusive-OR function is performed between corresponding bits of the source data addressed by bits 10-15 and the contents of workspace register specified by bits 6-9. The result is placed in workspace register R and is compared to zero to set status ST.

Invert—INV

Operation: The bits of the data addressed by the source address bits 10-15 are replaced by their complement. The result is compared to zero and is stored at the source location.

Application: INV is used to form the one's complement of 16-bit binary numbers, or to invert system data.

Clear—CLR

Operation: Zeroes are placed in the memory locatin specified by bits 10-15 of the instruction.

Application: CLR is used to set problem arguments to zero and to initialize memory locations to zero during system starting operations.

Set to One—SETO

Operation: All ones (or hex FFFF) are placed in the memory location specified by bits 10-15 of the instruction.

Set Ones Corresponding—SOC

Operation: This instruction performs the OR operation between corresponding bits of the source data address defined by bits 10-15 and the destination data addressed defined by bits 4-9. The result is compared to zero and is placed in the destination location.

Application: Provides the OR function between any two words in memory.

Set Ones Corresponding Byte—SOCB

Operation: Like SOC except used for bytes instead of words. The logical OR is performed between corresponding bit of the byte addressed by source address bits 10-15 and the byte addressed by the destination address of bits 4-9 with the result compared to zero and placed in destination location.

Set to Zeroes Corresponding—SZC

Operation: The source data addressed by bits 10-15 forms a mask for this operation. The bits in the destination data (addressed by bits 4-9) that correspond to the one bits of the source data (addressed by 10-15) are cleared. The result is compared to zero and is stored in the destination location.

Application: SZC allows the programmer to selectively clear bits of data words. For example, when an interrupt has been serviced, the interrupt request bit can be cleared by using the SCZ instruction.

Set to Zeroes Corresponding, Bytes—SZCB

Operation: Like SZC except for bytes instead of words. The byte addressed by the source address bits 10-15 will provide a mask for clearing certain bits of the byte addressed by the destination address bits 4-9. The bits in the destination byte that will be cleared are the bits that are one in the source byte. The result is compared to zero and is placed in the destination byte.

Shift Instructions

These instructions are used to perform simple binary multiplication and division on words in memory and to rearrange the location of bits in the word in order to examine a give bit with the carry (C) status bit.

Shift Right Arithmetic—SRA

Operation: The contents of the workspace register R specified by bits 12-15 are shifted right by a number of times specified by bits 8-11, referred to as Cnt, filling the vacated bit position with the sign (most significant bit) bit. The shifted number is compared to zero and status bits set.

Number of Shifts—Cnt (number from 0 to 15 contained in the instruction) specifies the number of bits shifted, unless Cnt is zero in which case the shift count is taken from the four least significant bits of workspace register 0. If both Cnt and these four bits are 0, a 16-bit position shift is performed.

Application: SRA provides binary division by a power of two defined by Cnt.

Shift Left Arithmetic—SLA

Operation: The contents of workspace register R specified by bits 12-15 are shifted left Dnt times (or if Dnt=0, the number of times specified by the least four bits of R0) filling the vacated positions with zeroes. Dnt is specified by bits 8-11. The carry contains the value of the last bit shifted out to the left and the shifted number is compared to zero and status bits set.

Application: SLA performs binary multiplication by a power of two defined by Cnt.

Shift Right Logical—SRL

Operation: The contents of the workspace register R specified by bits 12-15 are shifted right Cnt times, where Cnt is specified by its 8-11, (or if Cnt=0, the number of times specified by the least four bits or R0) filling in the vacated positions with zeroes. The carry contains the value of the last bit shifted out the right and the shifted number if compared to zero.

Application: Performs binary division by a power of two defined by Cnt.

Shift Right Circular—SRC

Operation: Workspace register R defined by bits 12-15 is right shifted Cnt time defined by bits 8-11. On each shift the bit shifted and the shifted number is compared to 0. The number of shifts to be performed is the number Cnt, or if Cnt=0, the number contained in the least significant four bits of R0.

Application: SRC can be used to examine a certain bit in the data word, change the location of 4-bit groups, or swap bytes.

Unconditional Branch Instructions

These instructions give the programmer the capability of choosing to perform the next instruction in sequence or to go to some other part of the memory to get the next instruction to be executed. The branch can be a subroutine type of branch, in which case the programmer can return to the point from which the branch occurred.

Branch—B

Operation: The source address, defined by bits 10-15, is placed in the program counter, causing the next instruction to be obtained from the location specified by this source address.

Application: This instruction is used to jump to another part of the program when the current task has been completed.

Branch and Link—BL

Operation: The source address defined at bits 10-15 is placed in the program counter and the address of the instruction following the BL instruction is saved in workspace register R11.

Application: This is a shared workspace subroutine jump. Both the main program and the subroutine use the same workspace registers. To get back to the main program at the branch point, a BL instruction can be used at the end of the subroutine which causes the R11 contents (old PC value) to be loaded into the program counter.

Unconditional Jump—JMP

Operation: The signed displacement defined by bits 8-15 is added to the current contents of the program counter PC to generate the new value of the program counter. The location jumped to must be within −128 to +127 words of the present location.

Application: If the subprogram to be jumped to is within 128 words of the JMP instruction location, the unconditional JMP is preferred over the unconditional branch since ony one memory word (and one memory reference) is required fr the JMP while two memory words and two memory cycles are required for the B instruction. Thus, the JMP instruction can be implemented faster and with less memory cost than can the B instruction.

Execute—X

Operation: The instruction located at the source address specified by bits 10-15 is executed.

Application: X is useful when the instruction to be executed is dependent on a variable factor.

Branch and Load Workspace Pointer—BLWP

Operation: The word specified by the source address bits 10-15 is loaded into the workspace pointer WP and the next word in memory (source address +2) is loaded into the program counter PC to cause the branch. The old workspace pointer is stored in the new workspace register R13, the old PC value is stored in the new workspace register R14, and the status register is stored in new workspace register R15.

Application: This is a constant switch subroutine jump with the transfer vector location specified by the source address. It uses a new workspace to save the old values of WP, PC, and ST (in the last three registers). The advantage of this subroutine jump over the BL jump is that the subroutine gets its own workspace and the main program workspace contents are not distributed by subroutine operations.

Extended Operation—XOP

Operation: Bits 6-9 specify which extended operation transfer vector is to be used in the context switch branch from XOP to the corresponding subprogram. The effective source address, bits 10-15, is placed in R11 of the subprogram workspace in order to pass an augment or data location to the subprogram.

Application: This can be used to define a subprogram that can be called by a single instruction. As a result, the programmer can define special purpose instructions to a augment the standard instruction set for the processor.

Return with Workspace Pointer—RTWP

Operation: This is a return from a context switch subroutine. It occurs by restoring the WP, PC, and ST register contents by transferring the contents of subroutine workspace registers R13, R14 and R15, into the WP, PC and ST registers, respectively.

Application: This is used to return from subprograms that were reached by a transfer vector operation such as an interrupt, extended operation, or BLWP instruction.

Conditional Jump Intructions—JH, JL, JHE, JLE, JGT, JLT, JEQ, JNE, JOC, JNC, JNO, JOP

These instructions perform a branching operation to a location defined by bits 8-15 only if certain status bits meet the conditions required by the jump. These instructions allow decision making to be incorporated into the program. The conditional jump instruction mnemonics are summarized below along with the status bit conditions that are tested by these instructions.

Operation: If the condition indicated by the branch mnemonic (specified by bits 4-7) is true, the jump will occur using relative addressing as was used in the unconditional JMP instruction. That is, the bits 8-15 define a displacement that is added to the current value of the program counter to determine the location of the next instruction, which must be within 128 words of the jump instruction.

Status Bits Tested by Instructions

| Mnemonic | L | A | EQ | C | OV | OP | Jump if: | CODE* |
|---|---|---|---|---|---|---|---|---|
| JH | X | — | X | — | — | — | L EQ=1 | B |
| JL | X | — | X | — | — | — | L +EQ=0 | A |
| JHE | X | — | X | — | — | — | L +EQ=1 | 4 |
| JLE | X | — | X | — | — | — | L +EQ=1 | 2 |
| JGT | — | X | — | — | — | — | A =1 | 5 |
| JLT | — | X | X | — | — | — | A +EQ=0 | 1 |
| JEQ | — | — | X | — | — | — | EQ=1 | 3 |
| JNE | — | — | X | — | — | — | EQ=0 | 6 |
| JOC | — | — | — | X | — | — | C=1 | 8 |
| JNC | — | — | — | X | — | — | C=0 | 7 |
| JNO | — | — | — | — | X | — | OV=0 | 9 |
| JOP | — | — | — | — | — | X | OP=1 | C |

*CODE is the CODE field (bits 4-7) of the OPCODE to generate the machine coce for the instruction.

Application: Most algorithms and programs with loop counters require these instructions to decide which sequence of instructions to do next.

TABLE B

| INSTRUCTION | OPCODE | INSTRUCTION | OPCODE |
|---|---|---|---|
| SOCB | 1111XXXXXXXXXXXX | SRA | 00001000XXXXXXX |
| SOC | 1110XXXXXXXXXXXX | ABS | 0000011101XXXXXX |
| MOVB | 1101XXXXXXXXXXXX | SETO | 0000011100XXXXXX |
| MOV | 1100XXXXXXXXXXXX | SWPB | 0000011011XXXXXX |
| AB | 1011XXXXXXXXXXXX | BL | 0000011010XXXXXX |
| A | 1010XXXXXXXXXXXX | DECT | 0000011001XXXXXX |
| CB | 1001XXXXXXXXXXXX | DEC | 0000011000XXXXXX |
| C | 1000XXXXXXXXXXXX | INCT | 0000010111XXXXXX |
| SB | 0111XXXXXXXXXXXX | INC | 0000010110XXXXXX |
| S | 0110XXXXXXXXXXXX | INV | 0000010101XXXXXX |
| SZCB | 0101XXXXXXXXXXXX | NEG | 0000010100XXXXXX |
| SZC | 0100XXXXXXXXXXXX | CLR | 0000010011XXXXXX |
| DIV | 001111XXXXXXXXXX | X | 0000010010XXXXXX |

TABLE B-continued

| INSTRUCTION | OPCODE | INSTRUCTION | OPCODE |
|---|---|---|---|
| MPY | 001110XXXXXXXXXX | B | 0000010001XXXXXX |
| XOP | 001011XXXXXXXXXX | BLWP | 0000010000XXXXXX |
| XOR | 001010XXXXXXXXXX | RTWP | 00000011100XXXXX |
| CZC | 001001XXXXXXXXXX | RSET | 00000011011XXXXX |
| COC | 001000XXXXXXXXXX | IDLE | 00000011010XXXXX |
| JOP | 00011100XXXXXXXX | LIMI | 00000011000XXXXX |
| JH | 00011011XXXXXXXX | LWPI | 0000001011100000 |
| JL | 00011010XXXXXXXX | STST | 00000010110XXXXX |
| JNO | 00011001XXXXXXXX | STWP | 00000010101XXXXX |
| JOC | 00011000XXXXXXXX | CI | 00000010100XXXXX |
| JNC | 00010111XXXXXXXX | ORI | 00000010011XXXXX |
| JNE | 00010110XXXXXXXX | ANDI | 00000010010XXXXX |
| JGT | 0010101XXXXXXXXX | AI | 00000010001XXXXX |
| JHE | 00010100XXXXXXXX | LI | 00000010000XXXXX |
| JEQ | 00010011XXXXXXXX | MPYS | 0000000111XXXXXX |
| JLE | 00010010XXXXXXXX | DIVS | 0000000110XXXXXX |
| JLT | 00010001XXXXXXXX | | |
| JMP | 00010000XXXXXXXX | | |
| SRC | 00001011XXXXXXXX | | |
| SLA | 00001010XXXXXXXX | | |

TABLE C

ALU FUNCTIONS

| CONTROL LINES TO ALU | | | | ALU FUNCTION | |
|---|---|---|---|---|---|
| ALU 1 | ALU 2 | ALU 3 | ALU 4 | H3 Logic = 1 | H3 Logic = 0 |
| 0 | 0 | 0 | 0 | 1 | |
| 0 | 0 | 0 | 1 | A + B | |
| 0 | 0 | 1 | 0 | A + $\overline{B}$ | |
| 0 | 0 | 1 | 1 | A | |
| 0 | 1 | 0 | 0 | $\overline{A}$ + B | |
| 0 | 1 | 0 | 1 | B | |
| 0 | 1 | 1 | 0 | $\overline{A \oplus B}$ | ADD |
| 0 | 1 | 1 | 1 | A · B | |
| 1 | 0 | 0 | 0 | $\overline{A}$ + $\overline{B}$ | |
| 1 | 0 | 0 | 1 | A $\oplus$ B | A sub B |
| 0 | 0 | 1 | 0 | $\overline{B}$ | |
| 1 | 0 | 1 | 1 | A · $\overline{B}$ | |
| 1 | 1 | 0 | 0 | $\overline{A}$ | |
| 1 | 1 | 0 | 1 | $\overline{A}$ · B | |
| 1 | 1 | 1 | 0 | $\overline{A + B}$ | |
| 1 | 1 | 1 | 1 | 0 | |

TABLE D

TRUTH TABLE FOR TEST MODE

| PATTERN | CONTROLS | | DATA | | GOOD MEMORY OUT | | FAULTED - M)T+1) | | | | | | | |
|---|---|---|---|---|---|---|---|---|---|---|---|---|---|---|
| | | | | | | | IN-A | | IN-B | | IN-1 | | IN-2 | |
| | IN-1 | IN-2 | IN-A | IN-B | 1(T) | M(T+1) | S @ 1 | S @ 0 | S @ 1 | S @ 0 | S @ 1 | S @ 0 | S @ 1 | S @ 0 |
| T | 0 | 0 | 0 | 0 | 1 | 1 | | | | | 0 | | 0 | |
| U | 1 | 0 | 0 | 0 | 1 | 0 | 1 | | | | | | | |
| V | 1 | 0 | 1 | 0 | 1 | 1 | | 0 | | | | | | |
| W | 1 | 0 | 0 | 0 | 1 | 0 | | | | | | | 1 | |
| X | 0 | 1 | 0 | 0 | 1 | 0 | | | 1 | | | | | |
| Y | 0 | 1 | 0 | 1 | 1 | 1 | | | | 0 | | | | |
| Z | 0 | 1 | 0 | 0 | 1 | 0 | | | | | | | | 1 |

TABLE E

PIN DEFINITIONS FOR MESSAGE PROCESSOR CHIP

| PIN | FUNCTION |
|---|---|
| LAL | Address Latch for Local Bus. When LAL goes active (high) the address appearing on the address/data bus is latched. LAL can originate either within the chip 20 or from external to the chip 20. |
| LEN- | Data Enable for Local Bus. When LEN- goes active-low, the data is valid on the local address/data bus 23. |
| LI/D- | Instruction or Data Local Bus. When high, LI/D- indicates that an instruction fetch is in progress. When low, a data fetch is in progress. Can be used to select between ROM 27 and RAM 22. |
| LR/W- | Read or Write for Local Bus. When high, LR/W- indicates that a read cycle is being implemented. When low, a write cycle is being implemented. |
| LNMI- | Non-Maskable Interrupt for Local Bus. When this goes active low, the CPU 21 executes a non-maskable interrupt, jumping to a vector address. |
| LIRQ | Interrupt Request for Local Bus. Three pins. Contain the incoming interrupt code to define the interrupt level. |
| LBRDY | Local Bus Ready. External devices introduce wait states by holding LBRDY low. The CPU 21 continues wait states until LBRDY goes high. |
| LBRQ1- LBRQ2- | Local Bus Request 1 and 2. These inputs to chip 20 are driven active-low by the protocol handler chip 16 and the system interface chip 30, respectively, to request control of the local bus 23. LBRQ1- has priority over LBRQ2-. The local bus arbiter 26 of the chip 20 samples both signals at a given clock phase, and asserts either LBGR1- or LBGR2- on the next phase. |
| LBGR1- LBGR2- | Local Bus Grant 1 and 2. These outputs from the chip 20 are driven active low by the local bus arbiter 26 of the chip 20 in response to a bus request LBRQ1- or LBRQ2-, respectively. It indicates that the requesting device 16 or 20 may use the following cycle, if LBRDY is also asserted (high). |
| LBSYNC- | Local Bus Synchronization. Used only for test of chip 20. When active-low this pin forces the CPU 21 clock generator into the Q4 state. |
| TEST- TEST 0 | For normal operation, TEST- and TEST 0 are held high. For test operations, the input test |

TABLE E-continued

TEST 1 codes shown in the following list are
TEST 2 implemented.

| TEST- | TEST0 | TEST1 | TEST2 | |
|---|---|---|---|---|
| 1 | 1 | X | X | Normal Operation |
| 1 | 0 | X | X | RAM 22 disabled on the chip 20. When the chip 20 is local bus master, accesses to address in the range of the RAM 22 will be executed off-chip. |
| 0 | 0 | 0 | 0 | Module-in-place test mode. All output pins of the chip 20 are floated. |
| 0 | 0 | 0 | 1 | Entry point test mode. When MPRESET- goes active then is deactivated, if this code is present an external tester has control of the address input 46 to the control ROM 45 of the local CPU 21. |
| 0 | 0 | 1 | 0 | Test mode for general purpose timer 25 in chip 20. A microcode sequence is executed for testing the timer. |
| 0 | 0 | 1 | 1 | Not specified. |
| 0 | 1 | 0 | X | Dump for Control ROM 45. When MPRSET- is deasserted, the CPU 21 enters a state that dumps the contents of the control ROM 45, shifting each 130-bit control word out serially on a pin (such as LBGR2- pin). The TEST2 pin is toggled to increment the control ROM address register. |
| 0 | 1 | 1 | X | Refresh test mode for RAM 22. When MPRSET- is deasserted, the chip 20 enters a state that permits testing of the internal nodes in the RAM 22 refresh logic. TEST2 provides timing information. |

TABLE F

PIN DEFINITION FOR SYSTEM INTERFACE CHIP

| PIN | FUNCTION |
|---|---|
| SI/M- | System Mode select. This input pin, if held high, at I-mode, causes the chip 30 to be compatable with an 8086 or 8088 microprocessor chip 31. If held low, at M-mode, SI/M- causes the chip 30 to operate in a format compatable with a 68000 microprocessor chip 31. |
| S8/16- | System 8/16-bit bus select. If held low, an interface mode with a 16-bit data bus 34 is selected (the 8086 device). If held high, an 8-bit data bus 34 is selected (for 8088 device, for example). |
| SRSET | System Reset. This input pin places the entire adapter 10 in a known initial state. The chip 30 passes this signal through to the chip 20 via the LRESET- pin. |
| SCS- | System Chip Select. An input pin to chip 30 from the host CPU 31 functioning as chip select to allow the host processor 12 to execute a memory-mapped I/O to the chip 30 for read or write. |
| SRS0 SRS1 SRS2 | System Register Select. These three inputs to the chip 30 select the word or byte to be addressed during a memory-mapped I/O access from host CPU 31 to the chip 30. |
| SBHE-/ SRNW | System Byte High Enable or Read/Not Write. In the I-mode (SI/M- = 1) this pin serves as an active-low byte-high-enable signal SBHE-. In the M-mode, (SI/M- =0), serves as a control signal which is high to indicate a read cycle and low to indicate a write cycle. The chip 30 drives this pin as an output during DMA onto the system bus 34; it is an input during memory-mapped I/O cycles from host CPU 31 to chip 30. |

TABLE F-continued

PIN DEFINITION FOR SYSTEM INTERFACE CHIP

| PIN | FUNCTION |
|---|---|
| SWR-/ SLDS | System Write Strobe or Lower Data Strobe. In I mode, this pin serves as the active-low write strobe. In M-mode, serves as the active-low lower data strobe. An input to chip 30 during memory-mapped I/O, and an output during DMA. |
| SRD-/ SUDS | System Read Strobe or Upper Data Strobe indicator. In the I-mode, this pin is an active-low strobe indicating that a read cycle is performed on the system bus 34. In M-mode, an active-low strobe indicating that data is transferred on the most significant byte of the system bus 34. An input to chip 30 during memory-mapped I/O, and an output during DMA. |
| SRAS/ SAS- | System Register Address Strobe or Memory Address Strobe. In I-mode, this pin serves as the system register address strobe, by means of which SCS-, SRS0 to SRS2, and SBHE- are latched. In I-mode, the SBHE- input is also latched. In a minimum-chip system, SRAS is typically tied to the ALE output of the host CPU 31. This latching capability is easily defeated, as is usually desired in expanded 8086/8088 systems supporting non-multiplexed address and data busses. The internal latch for these inputs remains transparent as long as SRAS remains high, permitting this pin to be strapped high and the signals at the SCS-, SBHE-, and SRS0 to SRS2 inputs to be applied independent of an ALE strobe from the host CPU 31. In M-mode, this pin is an active-low address strobe, which is an input during memory-mapped I/O and an output during DMA. |
| SRDY-/ SDTACK- | System Bus Ready or Data Transfer Acknowledge. In I-mode, this pin serves as an active-low bus ready signal. In M-mode, this pin serves as the active-low data transfer acknowledge signal. The purpose of the SRDY- and SDTACK- signals is to indicate to the bus master that a data transfer is complete. SRDY-/SDTACK- is internally synchronized to SBCLK; it must be asserted before the falling edge of SBCLK in state T2 in order to prevent a wait state. SRDY- SDTACK- is an output when the system interface chip 30 is selected for memory-mapped I/O, and an input otherwise. |
| SALE | System Address Latch Enable. At the start of each DMA cycle, this output from chip 30 provides the enable pulse used to externally latch the sixteen LSBs of the address from the multiplexed address/data lines. |
| SXAL | System Extended Address Latch. This output provides the enable pulse used to latch (external to the chips 30) the eight address extension bits of the 24-bit system address during DMA. SXAL is activated prior to the first cycle of each block DMA transfer, and thereafter as necessary (whenever an increment of the DAM address counter causes a carry-out of the lower 16-bits). |
| SDIR | System Data Direction. This output provides to the external data buffers a signal indicating the direction in which the data is moving. During memory-mapped I/O writes and DMA reads, SDDIR is low (input mode); during MMIO reads and DMA writes, SDDIR is high (output mode), as follows: |

| SDDIR | DIRECTION | MMIO | DMA |
|---|---|---|---|
| 0 | input | write | read |
| 1 | output | read | write |

When the system interface chip 30 is not involved in a memory-mapped I/O or DMA operation, then SDDIR is high by default.

| SDBEN- | System Data Bus enable. This output provides to data buffers in system 12 external to the chip 30, the active-low enable signal that causes them to leave the high-impedance state and begin transmitting data. This output is activated during both memory-mapped I/O and DMA. |
|---|---|
| SOWN- | System Bus Owned. This output goes active-low |

TABLE F-continued
PIN DEFINITION FOR SYSTEM INTERFACE CHIP

| PIN | FUNCTION |
|---|---|
| | during DMA cycles to indicate to external devices that the chip 30 has control of the system bus. SOWN- drives the enable signal of the bus transceivers chips which drive the address and bus control signals. |
| SBCLK | System Bus Clock. This is the external clock signal with which the chip 30 synchronizes its bus timing for both memory-mapped I/O and DMA transfers. |
| SHRQ-/ SBRQ- | System Hold Request or Bus Request. This output is used to request control of the system bus 34 in preparation for a DMA transfer. In I-mode, it is an active-high hold request, as defined in the standard 8086/8088 interface. In M-mode, it is an active-low bus request, as defined in the standard 68000 interface. |
| SHLDA/ SBGR- | System Hold Acknowledge or Bus Grant. In I-mode, this active-high pin indicates that the DMA hold request has been acknowledged, in accordance with the standard 8086/8088 interface. In M-mode, this pin is an active-low bus grant, as defined in the standard 68000 interface. In either mode, it is internally synchronized to SBCLLK. |
| SBBSY- | System Bus Busy. This input signal samples the value of the 68000-style Bus Grant Acknowledge (BGACK-) signal. The chip 30 must sample SBBSY- high before it drives the system bus 34. Its operation is defined for both I-mode and M-mode. |
| SBRLS- | System Bus Release. This input is driven active-low during DMA to indicate that a higher-priority device requires the system bus 34 and the chip 30 to release the bus as soon as possible. When the chip 30 is not performing DMA, this input is ignored. Its operation is defined for both I- and M-modes synchronized to SBCLK. |
| SINTR/ SIRQ- | System Interrupt Request. The chip 30 activates this output to signal an interrupt request to the host processor 12. In I-mode, this pin is active-high; it is active-low in M-mode. |
| SIACK- | System Interrupt Acknowledge. This input is driven active-low by the host processor 12 to acknowledge the interrupt request from the chip 30. The chip 30 responds to this signal by gating its interrupt vector onto the system bus 34. System busses not requiring an interrupt cycle may strap SIACK- high. |
| SBERR- | Bus Error. This input is driven active-low during a DMA cycle to indicate to the chip 30 that the cycle must be terminated abnormally. It corresponds to the Bus Error signal of the 68000 microprocessor. It is internally synchronized to SBCLK. It is sampled in both I- and M-modes. |
| SADH 0 to 7 | System Address/Data Bus (high byte). This is the most significant byte of the 16-bit address/data bus 34. In I-mode, it is attached to the host system address/data bus 34 bits 15-8. In M-mode, it is attached to the host system address/data bus 34 bits 0-7 (using 68000 standard bit numbering conventions). |
| SADL 0 to 7 | System Address/Data Bus (low byte). This is the least significant byte of the 16-bit address/data bus. In I-mode, it is attached to the host system address/data bits 7-0 (using 8086 standard bit numbering conventions.) |
| SPH | System Parity High. Contains an odd-parity bit for each data or address byte transmitted over SADH 0 to 7. |
| SPL | System Parity Low. Contains an odd-parity bit for each data or address byte transmitted over SADL 0 to 7. |
| LBCLK1 LBCLK2 | Local Bus Clock 1 and Local Bus Clock 2. These signals are the input clock for all local bus transfers. LBCLK1 follows LBCLK2 by 90 degrees. |
| LAL | Local Address Latch Enable. At the beginning of each local bus cycle, LAL is driven high and then low to strobe the address local bus 23 on and into an external latch. The LAL signal is an |

TABLE F-continued
PIN DEFINITION FOR SYSTEM INTERFACE CHIP

| PIN | FUNCTION |
|---|---|
| | output of the chip 30 when the chip 30 controls the local bus 23 and input to the chip 30 otherwise. |

What is claimed is:

1. A method of testing a processor device; said device formed at a face of a semiconductor body and having a standard mode of operation and an internal test mode of operation, the device containing:

(a) a control ROM at said face, said control ROM having addressing means with an input, the control ROM producing a plurality of sets of control signals at outputs thereof, each set corresponding to a given address at said input:

(b) a plurality of registers for holding data, each register having a plurality of stages, each stage having at least one input and at least one output and having separate control means for each such input and output;

(c) a plurality of busses, each bus including a set of separate conductive lines, each of said stages of the plurality of registers having at least one of said conductive lines connected to the input or output thereof via said control means;

(d) a plurality of control lines from the control ROM extending along said face, each of said control means in each of said stages of said registers being connected to a different one of said control lines;

(e) said control ROM including an array of cells for storing said plurality of sets of control signals for coupling to said control lines, the cells storing a first plurality of sequences of said sets of control signals to define said standard mode of operation, and for also storing a second plurality of sequences of said sets of control signals to define said test mode of operation;

(f) a plurality of terminals on said device, including a plurality of operating terminals and also test terminals, (g) said method comprising the steps of applying a first control code to test terminals of said processor device to cause said addressing means of the control ROM to address only said first plurality of sequences; or alternatively applying a second control code to said test terminals to cause said addressing means to address only said second plurality of sequences.

2. A method according to claim 1 wherein said addressing means for said control ROM receives an entry point address at said input derived from the contents of a register within said plurality of registers when in said standard operating mode.

3. A method according to claim 2 wherein said addressing means for said control ROM receives an entry point address at said input derived from test mode control circuitry responsive to said test terminals of said processor device when in said test mode of operation.

4. A method according to claim 3 wherein the device including a reset pin and circuitry to generate an address to said input for a reset mode of operation.

5. A method according to claim 4 wherein said test mode control circuitry is operative to respond to said test terminals only when said reset pin is activated.

6. A method of testing a microprocessor device; said device formed at a face of a semiconductor body and having internal test means, the device containing:
   (a) an ALU/register pattern on said face;
   (b) a control ROM on said face positioned alongside said pattern, said control ROM having addressing means with an input, the control ROM producing a plurality of sets of control signals at outputs coupled to said pattern, each set corresponding to a given address at said input;
   (c) said ALU/register pattern including:
      (i) an arithmetic logic unit having a plurality of stages, each bit having data inputs and a data output and having a plurality of control means;
      (ii) a plurality of registers for holding data and addresses, each register having a plurality of stages, each stage having at least one input and at least one output and having separate control means for each such input and output;
      (iii) a plurality of busses, each bus including a set of conductive lines, said lines extending along said face over said pattern; each of said stages of the arithmetic logic unit and the plurality of registers having at least one of said conductive lines extending across it and connected to the input or output thereof via said control means;
      (iv) a plurality of control lines extending along said face over said pattern; each of said control means in each of said stages of said arithmetic logic unit and said stages of each of said registers being connected to a different one of said control lines;
   (d) said control ROM including an array of cells for storing said plurality of sets of control signals for coupling to said control lines, the cells storing a first plurality of sequences of said sets of control signals to define a standard instruction set for a standard operating mode, and for also storing a second plurality of sequences of said sets of control signals to define at least one test mode of operation;
   (e) a plurality of terminals of said device, including operating terminals and also test terminals;
   (f) said method comprising the steps of:
      applying a first control code to test terminals of said device to cause addresses only of a first group to be applied to said addressing means of the control ROM to define said first plurality of sequences, or
      applying a second control code to said test terminals of said device to cause addresses only of a second group to be applied to said addressing means to define said second plurality of sequences.

7. A method according to claim 6 wherein said addressing means for said control ROM receives an entry point address at said input derived from the contents of an instruction register within said plurality of registers when in said standard operating mode.

8. A method according to claim 7 wherein said addressing means for said control ROM receives an entry point address at said input derived from test mode control circuitry responsive to said test terminals said microprocessor device when in said test mode of operation.

* * * * *